United States Patent
Azuma et al.

(10) Patent No.: US 12,018,344 B2
(45) Date of Patent: Jun. 25, 2024

(54) HIGH-STRENGTH STEEL SHEET AND METHOD FOR MANUFACTURING SAME

(71) Applicant: NIPPON STEEL CORPORATION, Tokyo (JP)

(72) Inventors: Masafumi Azuma, Tokyo (JP); Eisaku Sakurada, Tokyo (JP); Genki Abukawa, Tokyo (JP); Kenichiro Otsuka, Tokyo (JP); Takeshi Toyoda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 195 days.

(21) Appl. No.: 17/429,565

(22) PCT Filed: Mar. 19, 2020

(86) PCT No.: PCT/JP2020/012469
§ 371 (c)(1),
(2) Date: Aug. 9, 2021

(87) PCT Pub. No.: WO2020/196326
PCT Pub. Date: Oct. 1, 2020

(65) Prior Publication Data
US 2022/0112574 A1    Apr. 14, 2022

(30) Foreign Application Priority Data
Mar. 22, 2019 (JP) .................... 2019-055471

(51) Int. Cl.
C22C 38/00 (2006.01)
B32B 15/01 (2006.01)
(Continued)

(52) U.S. Cl.
CPC .............. *C21D 9/46* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

2012/0031528 A1  2/2012 Hayashi et al.
2014/0377582 A1  12/2014 Azuma et al.
(Continued)

FOREIGN PATENT DOCUMENTS

CN  104105807 A  10/2014
CN  105102657 A  11/2015
(Continued)

OTHER PUBLICATIONS

Nippon Steel Corporation, "High-Strength Steel Sheet and Method for Manufacturing Same", Complete Specification for Application No. IN 202117034706, 2006, 64 pages total.
(Continued)

Primary Examiner — Kim S. Horger
(74) Attorney, Agent, or Firm — Birch, Stewart, Kolasch & Birch, LLP

(57) ABSTRACT

A high-strength steel sheet includes a predetermined chemical composition, a microstructure contains, by volume percentage, 80% or more of tempered martensite, and a remainder consists of ferrite and bainite, the microstructure contains $5.0 \times 10^{11}$ pieces/mm$^3$ or more of, per unit volume, precipitate containing Ti and having an equivalent circle diameter of 5.0 nm or less, Hvs/Hvc which is a ratio of an average hardness Hvs at a position of a depth of 20 μm from a surface to an average hardness Hvc at a position of 0.20 to
(Continued)

0.50 mm from the surface is 0.85 or more, and the tensile strength is 1,180 MPa or more.

8 Claims, 8 Drawing Sheets

(51) Int. Cl.
| | |
|---|---|
| *C21D 6/00* | (2006.01) |
| *C21D 8/02* | (2006.01) |
| *C21D 9/46* | (2006.01) |
| *C22C 38/02* | (2006.01) |
| *C22C 38/06* | (2006.01) |
| *C22C 38/08* | (2006.01) |
| *C22C 38/16* | (2006.01) |
| *C22C 38/24* | (2006.01) |
| *C22C 38/26* | (2006.01) |
| *C22C 38/28* | (2006.01) |
| *C22C 38/38* | (2006.01) |
| *C23C 2/40* | (2006.01) |

(52) U.S. Cl.
CPC ............. *C21D 6/005* (2013.01); *C21D 6/008* (2013.01); *C21D 8/0205* (2013.01); *C21D 8/0226* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/16* (2013.01); *C22C 38/24* (2013.01); *C22C 38/26* (2013.01); *C22C 38/28* (2013.01); *C22C 38/38* (2013.01); *C23C 2/40* (2013.01); *C21D 2211/008* (2013.01)

(56) References Cited

U.S. PATENT DOCUMENTS

| | | | |
|---|---|---|---|
| 2015/0013856 A1* | 1/2015 | Murakami | ............. C22C 38/02 |
| | | | 148/624 |
| 2016/0053355 A1 | 2/2016 | Takagi et al. | |
| 2016/0273066 A1* | 9/2016 | Sakakibara | ............. C23C 2/06 |
| 2018/0216206 A1 | 8/2018 | Yokoi et al. | |
| 2019/0271051 A1 | 9/2019 | Kawasaki et al. | |
| 2019/0309398 A1 | 10/2019 | Sano et al. | |

FOREIGN PATENT DOCUMENTS

| | | |
|---|---|---|
| CN | 107849652 A | 3/2018 |
| EP | 3 000 905 A1 | 3/2016 |
| JP | 2001-220642 A | 8/2001 |
| JP | 2015-147958 A | 8/2015 |
| WO | WO 2010/137317 A1 | 12/2010 |
| WO | WO 2018/026013 A1 | 2/2018 |
| WO | WO 2018/092817 A1 | 5/2018 |

OTHER PUBLICATIONS

Faderl J: "Current Process and Equipment Developments in the Field of Hot Dip Galvanizing", vol. 123, No. 8, Aug. 15, 2003, pp. 41-45.

* cited by examiner

HIGH-STRENGTH STEEL SHEET AND METHOD FOR MANUFACTURING SAME

TECHNICAL FIELD OF THE INVENTION

The present invention relates to a high-strength steel sheet and a method for manufacturing the same.

Priority is claimed on Japanese Patent Application No. 2019-055471, filed Mar. 22, 2019, the content of which is incorporated herein by reference.

RELATED ART

In recent years, in order to protect the global environment, the fuel efficiency of vehicles has needed to be improved. Regarding the improvement of fuel efficiency of vehicles, high-strength steel sheets are being applied to steel sheets used for vehicle components (steel sheets for vehicles), in order to reduce a weight of a vehicle body while ensuring collision resistance, and the high-strength steel sheets are also being developed for undercarriage compartments. It is necessary that steel sheets applied to undercarriage compartments of vehicles have excellent fatigue resistance, in addition to high tensile strength and high proof stress (high YP).

For example, Patent Documents 1 and 2 disclose steel sheets which are highly strengthened by annealing a hot-rolled steel sheet and performing skin pass rolling before and after the annealing. In addition, Patent Documents 1 and 2 disclose that these steel sheets are excellent in fatigue resistance.

However, for both the high-strength steel sheets disclosed in Patent Documents 1 and 2, the tensile strength is less than 1,180 MPa.

In recent years, when further reducing weight of the vehicle, the tensile strength of 1,180 MPa or more is required for a steel sheet for a vehicle, and such demands cannot be answered in the technologies disclosed in Patent Documents 1 and 2.

As described above, in the related art, a steel sheet having high tensile strength of 1,180 MPa or more, high proof stress, and excellent fatigue resistance has not been proposed.

PRIOR ART DOCUMENT

Patent Document

[Patent Document 1] PCT International Publication No. WO 2018/026013

[Patent Document 2] PCT International Publication No. WO 2010/137317

DISCLOSURE OF THE INVENTION

Problems to be Solved by the Invention

The present invention has been made in view of the above problems. An object of the present invention is to provide a high-strength steel sheet having high proof stress, and excellent fatigue resistance and having tensile strength of 1,180 MPa or more, suitable for undercarriage compartments of vehicles, and a method for manufacturing the same.

Means for Solving the Problem

The present inventors have intensively studied a method for solving the above problems. As a result, it is found that, in a steel sheet having a predetermined chemical composition, a microstructure is set as a structure in which the primary phase is tempered martensite and the remainder consists of ferrite and bainite, the microstructure contains $5.0 \times 10^{11}$ pieces/mm$^3$ or more of precipitate, per unit volume, containing Ti and having an equivalent circle diameter of 5.0 nm or less, and Hvs/Hvc which is a ratio of an average hardness Hvs at a position of a depth of 20 μm from a surface to an average hardness Hvc at a position of 0.20 to 0.50 mm from the surface is 0.85 or more, and accordingly, a steel sheet having high proof stress, and excellent fatigue resistance, and tensile strength of 1,180 MPa or more can be manufactured.

In addition, the inventors found that in order to obtain such a steel sheet it is effective that a slab to be subjected to hot rolling is heated to higher than 1,280° C. to dissolve Ti or Nb contained in a large amount, a coiling temperature after the hot rolling is set to lower than 300° C. to obtain 80% or more of martensite fraction, precipitation of precipitate during the coiling after the hot rolling is suppressed, and the hot-rolled steel sheet after the coiling is lightly reduced to introduce dislocation, the dislocation is set as a nucleation site of the precipitate of Ti or Nb, and a heat treatment is performed in a temperature range of 450° C. to Ac1° C. for a short period of time, and thereby the precipitate containing fine Ti is precipitated by a predetermined amount or more.

The present invention has been made based on the above findings, and a gist thereof is as below.

(1) A high-strength steel sheet according to one aspect of the present invention, including, as a chemical composition, by mass %: C: 0.020 to 0.120%; Si: 0.01 to 2.00%; Mn: 1.00 to 3.00%; Ti: 0.010 to 0.200%; Nb: 0 to 0.100%; V: 0 to 0.200%; Al: 0.005 to 1.000%; P: 0.100% or less; S: 0.0100% or less; N: 0.0100% or less; Ni: 0 to 2.00%; Cu: 0 to 2.00%; Cr: 0 to 2.00%; Mo: 0 to 2.00%; W: 0 to 0.100%; B: 0 to 0.0100%; REM: 0 to 0.0300%; Ca: 0 to 0.0300%; Mg: 0 to 0.0300%; and a remainder of Fe and impurities, in which 0.100≤Ti+Nb+V≤0.450 is satisfied, a microstructure contains, by volume percentage, 80% or more of tempered martensite, and a remainder consists of ferrite and bainite, the microstructure contains $5.0 \times 10^{11}$ pieces/mm$^3$ or more of, per unit volume, precipitate containing Ti and having an equivalent circle diameter of 5.0 nm or less, Hvs/Hvc which is a ratio of an average hardness Hvs at a position of a depth of 20 μm from a surface to an average hardness Hvc at a position of 0.20 to 0.50 mm from the surface is 0.85 or more, and a tensile strength is 1,180 MPa or more.

(2) The high-strength steel sheet according to (1), may include, as the chemical composition, by mass %, at least one or two or more selected from the group consisting of: Ni: 0.01 to 2.00%; Cu: 0.01 to 2.00%; Cr: 0.01 to 2.00%; Mo: 0.01 to 2.00%; W: 0.005 to 0.100%; B: 0.0005 to 0.0100%; REM: 0.0003 to 0.0300%; Ca: 0.0003 to 0.0300%; and Mg: 0.0003 to 0.0300%.

(3) The high-strength steel sheet according to (1) or (2) may include a hot-dip galvanized layer on the surface.

(4) In the high-strength steel sheet according to (3), the hot-dip galvanized layer may be a hot-dip galvannealed layer.

(5) A method for manufacturing the high-strength steel sheet according to another aspect of the present invention is a method for manufacturing the high-strength steel sheet according to (1) or (2), the method including: a heating step of heating a slab including, as a chemical composition, by mass %: C: 0.020 to 0.120%; Si: 0.01 to 2.00%; Mn: 1.00 to 3.00%; Ti: 0.010 to 0.200%; Nb: 0 to 0.100%; V: 0 to 0.200%; Al: 0.005 to 1.000%; P: 0.100% or less; S: 0.0100% or less; N: 0.0100% or less; Ni: 0 to 2.00%; Cu: 0 to 2.00%; Cr: 0 to 2.00%; Mo: 0 to 2.00%; W: 0 to 0.100%; B: 0 to 0.0100%; REM: 0 to 0.0300%; Ca: 0 to 0.0300%; Mg: 0 to 0.0300%; and a remainder of Fe and impurities, to higher than 1,280° C.; a hot rolling step of performing hot rolling with respect to the slab such that a finish rolling temperature is 930° C. or higher to obtain a hot-rolled steel sheet; a coiling step of coiling the hot-rolled steel sheet at a temperature lower than 300° C. and cooling the hot-rolled steel sheet to room temperature; a pickling step of pickling the hot-rolled steel sheet after the coiling; a light reduction step of performing light reduction with respect to the hot-rolled steel sheet after the pickling step at rolling reduction of 1% to 30%; and a reheating step of reheating the hot-rolled steel sheet after the light reduction step in a temperature range of 450° C. to Ac 1° C. and holding for 10 to 1,500 seconds.

(6) The method for manufacturing a high-strength steel sheet according to (5) may further include a plating step of hot-dip galvanizing the hot-rolled steel sheet after the reheating step.

(7) The method for manufacturing a high-strength steel sheet according to (6) may further include performing a galvannealing step of galvannealing by heating the hot-rolled steel sheet after the hot-dip galvanizing step to 460° C. to 600° C.

Effects of the Invention

According to the above aspects of the present invention, it is possible to provide a high-strength steel sheet having a tensile strength of 1,180 MPa or more, which has high proof stress, and excellent fatigue resistance. This steel sheet has great industrial value, because it contributes to weight reduction of vehicle components. In addition, this steel sheet is suitable for undercarriage compartments of vehicles, since it has high strength (high tensile strength), high proof stress, and excellent fatigue resistance.

The high-strength steel sheet of the present invention includes a plated steel sheet such as a high-strength hot-dip galvanized steel sheet and a high-strength galvanized steel sheet including a galvanized layer on a surface.

EMBODIMENTS OF THE INVENTION

Figure 1A:
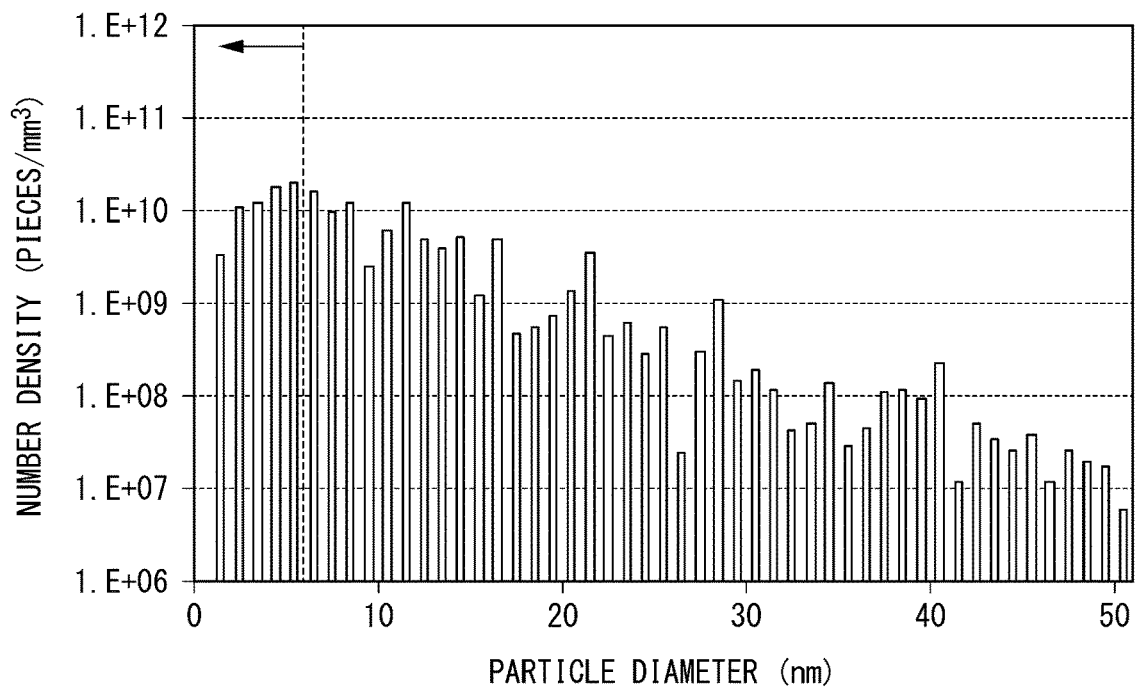
FIG. 1A is a diagram showing the number density of precipitate containing Ti in each particle diameter for a comparative steel (steel number C9 of examples).

A high-strength steel sheet according to one embodiment of the present invention (hereinafter, steel sheet according to the present embodiment) includes a predetermined chemical composition, a microstructure contains, by volume percentage, tempered martensite of 80% or more, a remainder consists of ferrite and bainite, the tempered martensite contains $5.0 \times 10^{11}$ pieces/mm$^3$ or more of, per unit volume, precipitate having an equivalent circle diameter of 5.0 nm or less and containing Ti, and Hvs/Hvc which is a ratio of an average hardness Hvs at a position of a depth of 20 μm from a surface to an average hardness Hvc at a position of 0.20 to 0.50 mm from the surface is 0.85 or more. In addition, the steel sheet according to the present embodiment has a tensile strength of 1,180 MPa or more.

Hereinafter, the steel sheet according to the present embodiment will be described in detail.

<Microstructure Contains Tempered Martensite of 80% or More by Volume Percentage, and the Remainder Consists of Ferrite and Bainite>

First, reasons for limiting the microstructure (metallographic structure) will be described.

In the steel sheet according to the present embodiment, primary phases of the microstructure are tempered martensite of 80% or more by volume percentage.

As will be described later, the steel sheet according to the present embodiment is controlled so that the precipitate, having an equivalent circle diameter of 5.0 nm or less and containing Ti, has a number density of $5.0 \times 10^{11}$ pieces/mm$^3$ or more, by using hot rolling, subsequent dislocation introduction under light reduction and heat treatment. Accordingly, it is necessary to set the primary phases of the microstructure before the heat treatment, as martensite containing many dislocations as precipitation sites of precipitate during the heat treatment. By performing the heat treatment with respect to the martensite containing many dislocations, tempered martensite containing fine precipitate becomes the primary phase.

In addition, since ferrite and bainite are formed at a high temperature, in a case where these structures are formed, precipitate containing Ti precipitated therein also tends to coarsen. In this case, it is not possible to ensure $5.0 \times 10^{11}$ pieces/mm$^3$ or more of the precipitate containing Ti and having an equivalent circle diameter of 5.0 nm or less. This also implies that, it is necessary that the microstructure contains, by volume percentage, tempered martensite of 80% or more in total, and the remainder is 20% or less. Preferably, the volume percentage of tempered martensite is 90% or more. In the present embodiment, the tempered martensite means martensite containing precipitate containing cementite and/or Ti.

For the microstructure, the steel sheet is cut out in parallel to a rolling direction, polished and etched with a nital reagent so that a sheet thickness direction is an observed section, and then a ¼ position of the sheet thickness from the surface in the sheet thickness direction is observed using a SEM at magnification of 1,000 to 30,000 times. Accordingly, ferrite, bainite, pearlite, and martensite can be identified. That is, the determination can be performed based on microstructural morphology, such that, the ferrite is an equiaxed grain that does not contain iron-based carbides, the pearlite is a layered structure of ferrite and cementite, and the bainite is a lath-shaped structure and is a structure containing cementite or residual austenite between laths. The area ratio of each structure identified from the SEM observation image is obtained, and this is defined as the volume percentage.

The martensite includes both tempered martensites containing carbide in lath and as quenched martensite not containing carbide (fresh martensite), and these can be identified by observing with a SEM and a TEM, and confirming the presence or absence of carbide. In general, the tempered martensite often refers to those containing iron-based carbides such as cementite, but in the present embodiment, the martensite containing fine precipitate containing Ti is also defined as the tempered martensite. Each volume percentage is obtained by observing 5 or more viewing fields (for example, 5 to 10 viewing fields) at the above magnification and averaging the fractions of each structure obtained in each viewing field.

<Microstructure Contains, Per Unit Volume, $5.0 \times 10^{11}$ Pieces/Mm$^3$ or More of the Precipitate Containing Ti and Having an Equivalent Circle Diameter of 5.0 nm or Less>

Next, a reason why the present inventors focused on a size and a number density of the precipitate will be described. The present inventors conducted intensive studies about the relationship between the size and the number density of precipitate for ensuring a tensile strength of 1,180 MPa or more. As a result, it was found that, the size (equivalent circle diameter) of the precipitate contained in the hot-rolled steel sheet of the related art and steel sheets in Patent Documents 1 and 2 could not be controlled to 5.0 nm or less, and the number density was also small. Accordingly, the tensile strength of 1,180 MPa or more cannot be ensured. As a result of further studies by the present inventors, it is found that, the reason of this is that, the number density of the precipitate having an equivalent circle diameter of 5.0 nm or less is less than $5.0 \times 10^{11}$ pieces/mm$^3$ in Patent Documents 1 and 2, since the amount of Ti and the like forming the precipitate is small or it exists as coarse precipitate at a stage of the slab and is not dissolved even during the slab heating even when the Ti and the like are contained, and the TiC precipitated in the heat treatment during a long period of time such as coiling after hot rolling are coarsened.

In the steel sheet according to the present embodiment, by setting the tempered martensite containing precipitate containing Ti and having an equivalent circle diameter of 5.0 nm or less in a number density of $5.0 \times 10^{11}$ pieces/mm$^3$ or more as a primary phase, the tensile strength of 1,180 MPa or more can be ensured and the fatigue resistance is also excellent.

The reasons for limiting the size and number density of the precipitate will be described.

The number density, per unit volume, of the precipitate containing Ti and having an equivalent circle diameter of 5.0 nm or less is set to $5.0 \times 10^{11}$ pieces/mm$^3$ or more, in order to ensure the tensile strength of 1,180 MPa or more. In a case where the number density is less than $5.0 \times 10^{11}$ pieces/mm$^3$, it is difficult to ensure the tensile strength of 1,180 MPa or more. Therefore, the number density of precipitate containing Ti and having an equivalent circle diameter of 5.0 nm or less needs to be $5.0 \times 10^{11}$ pieces/mm$^3$ or more.

The precipitate is set as the precipitate containing Ti, since a large amount of the precipitate containing Ti is easily dissolved in the heating stage of the slab before hot rolling, and the precipitate is precipitated as a fine precipitate having the equivalent circle diameter of 5.0 nm or less. The type of precipitate such as carbide, nitride, carbonitride, and the like is not limited, and particularly, the carbide is preferable, since it is precipitated as a fine precipitate having a diameter of 5.0 nm or less and contributes to improvement of strength. The precipitate of Ti is mainly contained in the tempered martensite, which is the primary phase.

Although Nb has an effect similar to that of Ti, the amount of Nb carbide that can be dissolved in the heating stage of the slab is small, and even in a case where Nb is contained alone, the tensile strength of 1,180 MPa or more cannot be ensured. In addition, although V can be dissolved in a large amount in the heating stage of the slab, the size of the precipitate is relatively large, and even in a case where V is contained alone, it is difficult to ensure $5.0 \times 10^{11}$ pieces/mm$^3$ or more of the precipitate having a diameter of 5.0 nm or less. Accordingly, it is necessary to use the precipitate containing Ti. However, as long as $5.0 \times 10^{11}$ pieces/mm$^3$ or more of the precipitate having a diameter of 5.0 nm or less can be ensured, a composite precipitate ((Ti, Nb, V) C, and the like) having a structure in which a part of Ti is substituted with Nb, V, and/or Mo may be used.

The reason why the size of the precipitate is controlled to 5.0 nm or less in terms of the equivalent circle diameter together with the number density described above is to ensure the tensile strength of 1,180 MPa or more. For the precipitate having the equivalent circle diameter more than 5.0 nm, the number density cannot be set to $5.0 \times 10^{11}$ pieces/mm$^3$ or more, and the tensile strength of 1,180 MPa or more cannot be ensured.

The equivalent circle diameter is a value in a case where observed shape of the precipitate is assumed as a circle, and converted into a diameter of a circle whose area is equivalent. Specifically, the precipitate of Ti may have a plate shape or needle shape, in addition to the spherical shape. However, the area of the observed precipitate is measured, the precipitate is assumed to be a circle, and a value converted into a diameter of the circle whose area is equivalent is defined as the equivalent circle diameter.

The steel sheet according to the present embodiment ensures the strength of the steel sheet by utilizing precipitation hardening. Accordingly, the softening in a heat-affected zone, which has been a problem during welding such as arc welding, can be suppressed, and the fatigue strength of the weld is also excellent. In addition, the steel sheet according to the present embodiment has increased strength due to the precipitate containing Ti and having an equivalent circle diameter of 5.0 nm or less. In such a case, a yield ratio (=YP/TS), which is a ratio of yield stress (YP) to tensile strength (TS), is extremely high at 0.90 or more. By using the steel sheet according to the present embodiment having a high yield ratio, it is possible to provide undercarriage compartments for vehicles that are not easily deformed during riding on a curb or colliding.

Regarding the number density of the precipitate containing Ti, the number density, per equivalent circle diameter at a pitch of 1.0 nm, of the precipitate contained per unit volume of the steel sheet (for example, the number density of the equivalent circle diameter more than 0 nm and 1.0 nm or less, the number density of the equivalent circle diameter more than 1.0 nm and 2.0 nm or less, the number density of the equivalent circle diameter more than 2.0 nm and 3.0 nm or less, and the like) is measured using an electrolytic extraction residual method. The number density of the precipitate is desirably measured at from a thickness position of 0.20 mm to 3/8 in a depth direction from the surface where a typical structure of the steel sheet is obtained, for example, from the position in the vicinity of 1/4 of the sheet thickness from the surface. The sheet thickness center is not preferable as a measurement position, because coarse carbides may be present due to the influence of center segregation and a local chemical composition differs due to the influence of segregation. The position less than 0.20 mm in the depth direction from the surface is not preferable as the measurement position, because it is affected by high-density dislocation introduced under light reduction or decarburization during the heating, and the number density of carbides may differ from the inside.

In the measurement, composition analysis of a carbide is performed with a transmission electron microscope (TEM) and an EDS, and it may be confirmed that fine precipitate is the precipitate containing Ti. Specifically, the steel sheet is polished from the surface to a 1/4 position of the sheet thickness, about 1 g of the steel sheet is dissolved according to the electrolytic extraction residual method, the obtained solution containing Ti precipitate is filtered with a filter paper, and the obtained precipitate is attached to C replica and observed with the TEM. In the observation, the magnification is set to 50,000 to 100,000 times, the viewing field is set to 20 to 30, and the chemical composition of the obtained precipitate is specified with the EDS. Then, the image obtained by the TEM observation is subjected to image analysis, and the equivalent circle diameter and the number density of each precipitate are calculated.

The lower limit of the size of the precipitate which is a measurement target is not particularly determined, and the effect can be obtained by setting the number density of the precipitate having the equivalent circle diameter of 5.0 nm or less to $5.0 \times 10^{11}$ pieces/mm$^3$ or more per unit volume. However, in the hot-rolled steel sheet according to the present embodiment, since it is considered that the amount of the precipitate having the equivalent circle diameter less than 0.4 nm is small, the precipitate having the equivalent circle diameter of 0.4 nm or more may be set as a substantial target.

<Ratio Hvs/Hvc of Average Hardness Hvs at Position of Depth of 20 μm from Surface to Average Hardness Hvc at Position of 0.20 to 0.50 mm from the Surface is 0.85 or More>

In the steel sheet according to the present embodiment, it is necessary to set Hvs/Hvc which is a ratio of an average hardness Hvs at a position of a depth of 20 μm from a surface to an average hardness Hvc at a position of 0.20 to 0.50 mm from the surface (in the sheet thickness direction, range from the position of 0.20 mm from the surface to the position of 0.50 mm from the surface) to 0.85 or more.

The ratio Hvs/Hvc of the average hardness Hvs at the position of 20 μm in the sheet thickness direction from the surface to the average hardness Hvc at the position of 0.20 to 0.50 mm in the sheet thickness direction from the surface is set to 0.85 or more, in order to increase the Hvs/Hvc and largely improve fatigue resistance.

In general, fatigue fracture occurs from the surface. Accordingly, it is effective to harden a surface layer, in order to suppress occurrence of fatigue crack. Meanwhile, the hot-rolled steel sheet is exposed to an oxidizing atmosphere during slab heating and hot rolling. Accordingly, decarburization and the like easily occur and the surface layer hardness is easily reduced. In a case where the surface layer hardness is reduced, the fatigue resistance is deteriorated.

As a result of intensive studies by the present inventors, it is found that, by combining the light reduction and subsequent heat treatment, the surface layer can be preferentially hardened, thereby improving fatigue resistance.

The hardness at the position of 20 μm in the depth direction from the surface (sheet thickness direction) is defined as the hardness of the surface layer, because the fatigue resistance can be improved by increasing the hardness at this position. In addition, it is because that, it is difficult to measure the hardness at a position less than 20 μm from the surface, because it is affected by the surface, and on the other hand, the increase in hardness at the position inside the steel sheet than at the position 20 μm from the surface has slight correlation with the fatigue resistance.

The average hardness Hvc at the position of 0.20 to 0.50 mm from the surface is set as an average hardness in this range. The hardness of the sheet thickness center may not be stable due to the influence of segregation such as Mn. Therefore, it is desirable to avoid the measurement of the hardness of the sheet thickness center, that is, a segregation portion.

The reason why Hvs/Hvc is set to 0.85 or more is that a great effect of improving the fatigue resistance is exhibited by setting the hardness ratio to 0.85 or more. Since this effect is more greatly exhibited at 0.87 or more, Hvs/Hvc is preferably 0.87 or more. Hvs/Hvc is more preferably 0.90 or more.

The average hardness Hvs at the position of a depth of 20 μm from the surface and the average hardness Hvc at the position of 0.20 to 0.50 mm from the surface are obtained by the following method.

For the average hardness Hvs at the position of a depth of 20 μm from the surface, a sample is cut out from the ¼ position in the width direction of the steel sheet so that a cross section parallel to the rolling direction is a measurement surface, embedding polishing is performed, a Vickers hardness at the position of 20 μm from the surface is measured at 10 points with a load of 10 gf based on JIS Z 2244: 2009, and an average value thereof is set as Hvs. For the Hvc, a sample is cut out from the ¼ position in the width direction of the steel sheet so that a cross section parallel to the rolling direction is a measurement surface, embedding polishing is performed, a Vickers hardness at a pitch of about 0.05 mm in the sheet thickness direction from the position of 0.20 to 0.50 mm from the surface is measured at 7 points with a load of 10 gf (for example, measured at the positions of 0.20 mm, 0.25 mm, 0.30 mm, 0.35 mm, 0.40 mm, 0.45 mm, and 0.50 mm from the surface), and an average value thereof is set as Hvc.

<Tensile Strength of 1,180 MPa or More>

The steel sheet according to the present embodiment has a tensile strength of 1,180 MPa or more, in consideration of the strength required when further reducing the weight of vehicle.

The tensile strength (TS) was obtained by a tensile test performed based on JIS Z 2241:2011 using JIS No. 5 test piece cut out in the direction perpendicular to the rolling direction.

The sheet thickness of the steel sheet according to the present embodiment is not particularly limited, but is, for example, 1.0 to 4.0 mm, in consideration of manufacturing stability and the like. It is preferably 1.5 to 3.0 mm.

Next, the reason for limiting the chemical composition of the steel sheet according to the present embodiment will be described. % of the content indicates mass %.

C: 0.020 to 0.120%;

C is an element effective for increasing the strength of the steel sheet. In addition, C is an element that forms carbide containing Ti. In a case where the C content is less than 0.020%, it is not possible to ensure the number density of the carbide of $5.0 \times 10^{11}$ pieces/mm$^3$ or more. Therefore, the C content is set to 0.020% or more.

On the other hand, in a case where the C content exceeds 0.120%, not only the effect is saturated, but also the carbide is difficult to be dissolved during the slab heating. Therefore, the C content is set to 0.120% or less. It is preferably 0.090% or less.

Si: 0.01 to 2.00%

Si is an element that contributes to high-strengthening of a steel sheet by solid solution strengthening. Therefore, the Si content is set to 0.01% or more.

On the other hand, in a case where the Si content exceeds 2.00%, not only the effect is saturated, but also strong scale is generated on the hot-rolled steel sheet, and the external appearance and pickling property are deteriorated. Therefore, the Si content is set to 2.00% or less.

Mn: 1.00 to 3.00%

Mn is an element effective for increasing the volume percentage of tempered martensite in the microstructure of the steel sheet and increasing the strength of the steel sheet.

In order to set the volume percentage of tempered martensite to 80% or more, the Mn content is set to 1.00% or more. In a case where the Mn content is less than 1.00%, the volume percentage of tempered martensite decreases, and sufficient strengthening cannot be performed.

On the other hand, in a case where the Mn content exceeds 3.00%, the effect is saturated and the economic efficiency is lowered. Therefore, the Mn content is set to 3.00% or less.

Al: 0.005 to 1.000%

Al is an element effective for microstructure control by hot rolling and deoxidation. In order to obtain these effects, the Al content is set to 0.005% or more. In a case where the Al content is less than 0.005%, a sufficient deoxidation effect cannot be obtained, and a large amount of inclusions (oxide) is formed in the steel sheet.

On the other hand, in a case where the Al content exceeds 1.000%, the slab is embrittled, which is not preferable. Therefore, the Al content is set to 1.000% or less.

Ti: 0.010 to 0.200%
Nb: 0 to 0.100%
V: 0 to 0.200%;
$0.100 \leq Ti+Nb+V \leq 0.450$ (Ti, Nb, and V represent the Ti content, the Nb content, the V content in mass %, respectively)

Ti, Nb, and V are elements that form precipitates (carbide, nitride, carbonitride, and the like) by bonding with C or N, and contribute to improvement of steel sheet strength through precipitation hardening by these precipitates. In order to obtain $5.0 \times 10^{11}$ pieces/mm$^3$ or more of fine precipitate containing Ti and having the equivalent circle diameter of 5.0 nm or less through the manufacturing method which will be described later, the total content of Ti, Nb, and V (Ti+Nb+V) is set to 0.100% or more, while setting the Ti content to 0.010% or more. The total amount of Ti, Nb, and V is desirably 0.130% or more, and more desirably 0.150% or more.

On the other hand, containing excessive content of total amount of Ti, Nb, and V (Ti+Nb+V) which exceeds 0.450%, the slab or the steel sheet is embrittled, which causes troubles during manufacturing. Therefore, the total amount of Ti, Nb, and V is set to 0.450% or less.

In addition, the upper limit of the Ti content is set to 0.200%, the upper limit of the Nb content is set to 0.100%, and the upper limit of the V content is set to 0.200%, because, in a case where the amounts thereof exceed these upper limits, it is difficult to dissolve the coarse precipitates precipitated at a casting stage, even in a case where a lower limit of a slab heating temperature is set to higher than 1,280° C. Further, the excessive content of Ti, Nb, and V causes embrittlement of the slab and the steel sheet. Therefore, it is desirable that Ti content has an upper limit of 0.200%, Nb content has an upper limit of 0.100%, and V content has an upper limit of 0.200%.

Any combination of Ti, Nb, and V may be used for ensuring $5.0 \times 10^{11}$ pieces/mm$^3$ or more of fine carbide containing Ti and having the equivalent circle diameter of 5.0 nm or less, however, in order to dissolve the carbide during the heating of the hot-rolled slab, the content of Ti, which is easy to contain in a larger amount and is inexpensive, is at least 0.010% or more.

P: 0.100% or less

P is an element that segregates in a sheet thickness center portion of the steel sheet and is also an element that embrittles the weld. In a case where the P content exceeds 0.100%, the characteristics are greatly deteriorated. Therefore, the P content is set to 0.100% or less. It is preferably 0.050% or less. It is preferable that the P content is low, and the effect is exhibited without particularly determining the lower limit (may be 0%), but reducing the P content to less than 0.001% is economically disadvantageous. Therefore, the lower limit of the P content may be 0.001%.

S: 0.0100% or less

S is an element that causes slab embrittlement by being present as a sulfide. In addition, S is an element that deteriorates formability of the steel sheet. Therefore, the S content is limited. In a case where the S content exceeds 0.0100%, the characteristics are greatly deteriorated. Therefore, the S content is set to 0.0100% or less. On the other hand, the effect is exhibited without particularly determining the lower limit (may be 0%), but reducing the S content to less than 0.0001% is economically disadvantageous. Therefore, the lower limit of the S content may be 0.0001%.

N: 0.0100% or less

N is an element that forms coarse nitride and deteriorates bendability and hole expansibility. In a case where the N content exceeds 0.0100%, the bendability and the hole expansibility are greatly deteriorated. Therefore, the N content is set to 0.0100% or less. In addition, N becomes coarse TiN by bonding with Ti, and in a case where a large amount of N is contained, the number density of precipitate containing Ti and having the equivalent circle diameter of 5.0 nm or less is less than $5.0 \times 10^{11}$ pieces/mm$^3$. Therefore, it is preferable that the N content is low.

On the other hand, it is not necessary to particularly determine the lower limit of the N content (may be 0%), but in a case where the N content is reduced to less than 0.0001%, the manufacturing cost increases greatly. Therefore, the substantial lower limit of the N content is 0.0001%. From a viewpoint of manufacturing cost, the N content may be 0.0005% or more.

The above elements are the basic chemical composition of the steel sheet according to the present embodiment, the chemical composition of the steel sheet according to the present embodiment contains the above elements, the remainder may consist of Fe and impurities. However, for the purpose of improving various properties, the following compositions can be further contained. Since the following elements do not necessarily have to be contained, the lower limit of the content is 0%.

Ni: 0 to 2.00%
Cu: 0 to 2.00%
Cr: 0 to 2.00%
Mo: 0 to 2.00%

Ni, Cu, Cr, and Mo are elements that contribute to the high-strengthening of the steel sheet through microstructure control by hot rolling. When obtaining this effect, the effect is exhibited greatly, by containing one or two or more of Ni, Cu, Cr, and Mo in an amount of 0.01% or more, respectively. Therefore, when obtaining the effect, each content is preferably 0.01% or more.

On the other hand, in a case where the content of each element exceeds 2.00%, weldability, hot workability, and the like are deteriorated. Therefore, even when these are contained, the upper limit of each content of Ni, Cu, Cr, and Mo is set to 2.00%.

W: 0 to 0.100%

W is an element that contributes to the improvement of the strength of the steel sheet through precipitation hardening. When obtaining this effect, the W content is preferably set to 0.005% or more.

On the other hand, in a case where the W content exceeds 0.100%, not only the effect is saturated but also the hot workability is deteriorated. Therefore, even when this is contained, the W content is set to 0.100% or less.

B: 0 to 0.0100%

B is an element effective for controlling the transformation during hot rolling and improving the strength of the steel sheet through the structure strengthening. When obtaining this effect, the B content is preferably set to 0.0005% or more.

On the other hand, in a case where the B content exceeds 0.0100%, not only the effect is saturated, but also iron-based boride is precipitated, and an effect of improving hardenability by a solid solution B is lost. Therefore, the B content is preferably set to 0.0100% or less. The B content is more preferably 0.0080% or less, and even more preferably 0.0050% or less.

REM: 0 to 0.0300%
Ca: 0 to 0.0300%
Mg: 0 to 0.0300%

REM, Ca, and Mg are elements that affect the strength of the steel sheet and contribute to improvement of a material properties. In a case where a total of one or two or more of REM, Ca, and Mg is less than 0.0003%, a sufficient effect cannot be obtained. Therefore, when obtaining the effect, the total content of REM, Ca, and Mg is preferably set to 0.0003% or more.

On the other hand, in a case where each content of REM, Ca, and Mg exceeds 0.0300%, castability or hot workability is deteriorated. Therefore, even when these are contained, the amount of each is set to 0.0300% or less.

In the present embodiment, REM is an abbreviation for Rare Earth Metal and refers to an element belonging to the lanthanoid series, and the REM content is the total amount of these elements. REM is often added as mischmetal, and in addition to Ce, REM may contain elements of the lanthanoid series in a complex manner. Even in a case where the steel sheet according to the present embodiment contains elements of the lanthanoid series other than La or Ce as impurities, the effect is exhibited. In addition, although a metal is added, the effect is exhibited.

As described above, the steel sheet according to the present embodiment contains basic elements, contains optional elements, as necessary, and the remainder is Fe and impurities. The impurities refer to compositions that are unintentionally contained from a raw material in the manufacturing process of the steel sheet, or in other manufacturing steps. For example, as the impurities, O may be contained in a trace amount, in addition to P, S, and N. O may form oxide and may be present as inclusions.

The steel sheet according to the present embodiment may further include a hot-dip galvanizing on its surface. In addition, the hot-dip galvanized layer may be hot-dip galvannealed layer subjected to a galvannealing treatment.

Since the galvanizing contributes to the improvement of corrosion resistance, it is desirable to use a galvanized hot-dip galvanized steel sheet or hot-dip galvannealed steel sheet, in a case where the steel sheet is applied for the usage where corrosion resistance is expected.

Since there is a concern that the undercarriage compartments of a vehicle may be pitted due to corrosion, it may not be possible to thin the undercarriage compartments a certain sheet thickness or less, even in a case where the high-strengthening is performed. One object of high-strengthening of the steel sheet is reducing weight by thinning. Accordingly, although the high-strength steel sheet is developed, the application site is limited, in a case where the corrosion resistance is low. As a method for solving these problems, it is considered that the steel sheet is subjected to plating such as hot-dip galvanizing with high corrosion resistance. Since the steel sheet compositions are controlled as described above, the steel sheet according to the present embodiment can be subjected to the hot-dip galvanizing.

The plating layer may be electrogalvanized layer, or may be a plating containing Al and/or Mg, in addition to Zn.

Next, a preferable method for manufacturing the steel sheet according to the present embodiment will be described. The effect can be obtained, as long as the steel sheet according to the present embodiment has the above-mentioned characteristics, regardless of the manufacturing method. However, the following method is preferable, because it can be stably manufactured.

Specifically, the steel sheet according to the present embodiment can be manufactured by a manufacturing method including the following steps (I) to (VI).

(I) A heating step of heating a slab having a predetermined chemical composition to higher than 1,280° C.

(II) A hot rolling step of performing hot rolling with respect to the slab so that a finish rolling temperature is 930° C. or higher to obtain a hot-rolled steel sheet (III) A coiling step of coiling the hot-rolled steel sheet at lower than 300° C. and cooling it to room temperature (IV) A pickling step of pickling the hot-rolled steel sheet after the coiling step (V) A light reduction step of performing reduction the hot-rolled steel sheet after the pickling step with a rolling reduction of 1% to 30%.

(VI) A reheating step of reheating the hot-rolled steel sheet after the light reduction step to a temperature range of 450° C. to Ac1° C. and holding it for 10 to 1500 seconds Hereinafter, preferable conditions for each step will be described.

<Heating Step>

In the heating step, the slab having the above-mentioned chemical composition to be subjected to the hot rolling step is heated to higher than 1,280° C. The reason for setting the heating temperature to higher than 1,280° C. is for dissolving elements such as Ti, Nb, and V contained in the slab that contribute to precipitation hardening (in many cases, they are present as coarse precipitate of more than 5.0 nm in the slab), and precipitating $5.0 \times 10^{11}$ pieces/mm³ or more of the precipitate containing Ti and having the equivalent circle diameter of 5.0 nm or less in the subsequent heat treatment step. In order to ensure the precipitate having a predetermined number density, it is necessary to use a large amount of Ti, Nb, and V. Accordingly, it is necessary to heat the slab at a temperature equal to or higher than those in the invention of the related art (Patent Documents 1 and 2). In a case where the heating temperature is 1,280° C. or lower, Ti, Nb, and V are not sufficiently dissolved.

The upper limit of the heating temperature is not particularly limited, but in a case where it exceeds 1,400° C., not only the effect is saturated, but also the scale formed on the slab surface is dissolved, and the dissolved oxide damages a refractory in a heating furnace, which is not preferable. Therefore, the heating temperature is preferably 1,400° C. or lower.

<Hot Rolling Step>

The hot rolling is performed with respect to the heated slab. In the hot rolling, rough rolling is performed as necessary, and then finish rolling is performed. A finish rolling temperature (finish rolling completion temperature) is set to 930° C. or higher.

Since the steel sheet according to the present embodiment contains a large amount of Ti, Nb, and V, in a case where the temperature of the slab or the roughly rolled hot-rolled steel sheet before the finish rolling is decreased, precipitate containing Ti is formed. The carbide containing Ti which is precipitated at this stage has a large size. Accordingly, it is necessary to carry out the finish rolling and the coiling while suppressing the precipitate containing Ti before the finish rolling. In a case where the finish rolling temperature is lower than 930° C., the formation of precipitate containing Ti is remarkable. Accordingly, the finish rolling temperature is set to 930° C. or higher. It is not necessary to particularly limit the upper limit of the finish rolling temperature.

<Coiling Step>

The steel sheet after the hot rolling step (hot-rolled steel sheet) is cooled and then coiled. A coiling temperature of the hot-rolled steel sheet is set to lower than 300° C., and after the coiling, the hot-rolled steel sheet is cooled to room temperature in a state of a coil.

Any method can be used for cooling to the coiling temperature, as long as it can be cooled, but a method for cooling using water from a nozzle is generally used, and productivity is also excellent. In addition, the steel sheet according to the present embodiment needs to have martensite as the primary phase, and it is necessary to suppress the formation of ferrite, pearlite, and bainite structures before coiling. Accordingly, it is desirable to perform water cooling with a high cooling rate. A cooling rate for water cooling is, for example, 20° C./sec or higher. In addition, since the temperature lower than 300° C. is lower than the martensitic transformation start temperature, ferrite, pearlite, and bainite are hardly generated, in a case where water cooling is performed to this temperature range.

In a case where the coiling temperature is 300° C. or higher, bainite is formed and the volume percentage of martensite is less than 80%. In addition, during coiling, precipitate containing Ti is formed in the ferrite and bainite structures, and the precipitate is held at a high temperature for a long time. Accordingly, the number of precipitates having the equivalent circle diameter of more than 5.0 nm increases due to grain growth. As a result, the number density of fine precipitate is less than $5.0 \times 10^{11}$ pieces/mm³, even in a case where reduction and heat treatment are performed in a subsequent step. Therefore, the coiling temperature is set to less than 300° C.

The martensite after the coiling step may be either as-quenched martensite (fresh martensite) containing almost no iron-based carbide, or auto-tempered martensite in which iron-based carbide is precipitated in the martensite, in a case where it is cooled to room temperature after coiling.

The cooling conditions during cooling the coil coiled at lower than 300° C. to room temperature are not necessary to be particularly limited, but for example, the coil may be left to cool to room temperature.

<Pickling Step>

The hot-rolled steel sheet after the coiling step is pickled. By performing the pickling, it is possible to improve the plating property in the subsequent manufacturing step and increase the chemical convertibility in the vehicle manufacturing step. In addition, in a case where the hot-rolled steel sheet with a scale is lightly reduced, the scale is peeled off and is pushed in, which may cause a defect. Therefore, the hot-rolled steel sheet is first pickled before the light reduction.

The pickling conditions are not particularly limited, but the pickling is generally performed with hydrochloric acid or sulfuric acid containing an inhibitor.

<Light Reduction Step>

In the light reduction step, reduction is applied to the hot-rolled steel sheet after the pickling step at rolling reduction of 1% to 30%.

By preforming the reduction to the hot-rolled steel sheet, a precipitation site for precipitation of the precipitate in the heat treatment in the subsequent step is introduced. By introducing the precipitation site, the fine carbide containing Ti and having the equivalent circle diameter of 5.0 nm or less can be precipitated by $5.0 \times 10^{11}$ pieces/mm$^3$ or more by the heat treatment. In addition, as shown in FIGS. 4A to 4D, the TS, the Hvs/Hvc, and fatigue limit can be increased by setting the rolling reduction to 1% or more. Therefore, the reduction at rolling reduction of 1% or more is applied.

Meanwhile, in a case where the rolling reduction exceeds 30%, not only the effect is saturated, but also the recovery of the introduced dislocation becomes insufficient, resulting in a great deterioration in elongation. In addition, in the reheating step, which is a subsequent step, recrystallization may occur depending on the heating temperature and heating time, and the consistency between the Ti precipitate and a primary phase (here, recrystallized ferrite) is lost, and the amount of precipitation strengthening is reduced. In this case, it is difficult to ensure a tensile strength of 1,180 MPa or more. Therefore, the rolling reduction is set to 30% or less. The rolling reduction is preferably less than 20%, more preferably 15% or less, and even more preferably less than 15%.

As long as the dislocation that acts as a nucleation site of the precipitate can be introduced, the reduction may be performed by applying the reduction pf 1% to 30% in one pass, or by dividing into a plurality of times and the reduction may be performed so that the cumulative rolling reduction is 1% and 30%.

In the method for manufacturing the steel sheet according to the present embodiment, the light reduction step is the most important step and is a step with a role different from a so-called cold rolling. That is, the cold rolling is usually performed for controlling the sheet thickness of the steel sheet, controlling a texture or controlling the grain diameter by using recrystallization. However, the light reduction step in the present embodiment is performed, in order to promote the fine carbide precipitation due to the introduction of dislocation, as described above.

<Reheating Step>

The hot-rolled steel sheet after the light reduction step is subjected to the heat treatment in which the hot-rolled steel sheet is reheated to a temperature range of 450° C. to Ac1° C., and held at this temperature range for 10 to 1,500 seconds. By performing the heat treatment by reheating the hot-rolled steel sheet after the light reduction step, the precipitate containing Ti and having the equivalent circle diameter of 5.0 nm or less can be precipitated by $5.0 \times 10^{11}$ pieces/mm$^3$ or more. In a case where the heat treatment temperature (reheating temperature) in the reheating step is lower than 450° C., the diffusion of atoms is insufficient and a sufficient amount of the precipitate cannot be obtained. Considering the heat treatment in a short period of time, the heat treatment temperature is desirably 500° C. or higher. In a case where the heat treatment temperature exceeds Ac1° C., the precipitate is coarsened and austenite formed in the heat treatment transform into ferrite or bainite during the cooling. Accordingly, the volume percentage of tempered martensite may not be 80% or more, and a consistent relationship between the Ti precipitate and the primary phase (here, martensite transformed from the austenite in the cooling process) may collapse due to the transformation to the austenite, and the amount of precipitation hardening is reduced. As a result, it is difficult to ensure the tensile strength of 1,180 MPa or more, although the number density of the precipitate is within the above range. Therefore, the heat treatment temperature is set to Ac1° C. or lower and desirably 700° C. or lower. Ac1 (Ac1 transformation point) (° C.) can be specified by measuring the expansion curve during the heating. Specifically, the Ac1 transformation point can be specified by measuring the transformation curve during the heating at 5° C./sec.

Figure 1B:
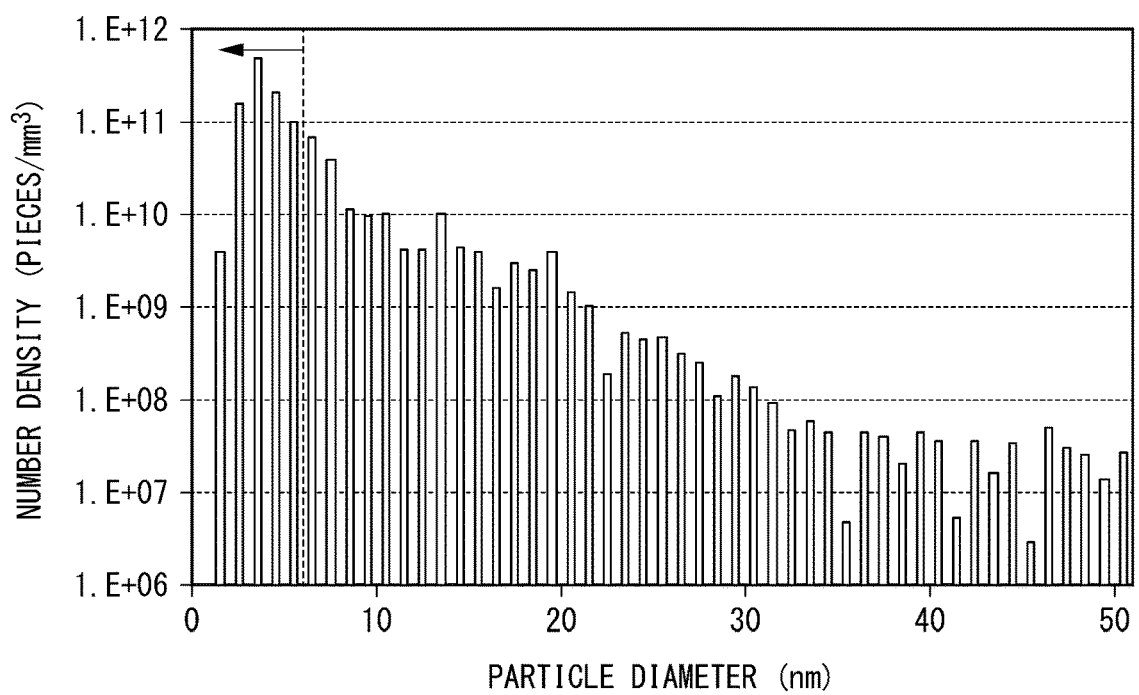
FIG. 1B is a diagram showing the number density of precipitate containing Ti in each particle diameter for a steel of the present invention (steel number C5 of examples).

FIGS. 1A and 1B are diagrams showing number density of the precipitate containing Ti for each particle diameter (equivalent circle diameter) of steel number C9 (without reheating) and steel number C5 (reheated to 640° C.) in the examples.

As shown in FIG. 1B, by performing suitable reheating (heat treatment) after light reduction, it is found that, the number density (number density on the left side of a broken line in the drawing) of the precipitate containing Ti and having the particle diameter (equivalent circle diameter) of 5.0 nm or less increases.

In addition, as shown in FIGS. 3A to 3D, by setting the reheating temperature (heat treatment temperature) to 450° C. to Ac1° C., the number density of the precipitate containing Ti and having the particle diameter (equivalent circle diameter) of 5.0 nm or less, TS, Hvs/Hvc, and the fatigue limit after heat treatment and light reduction increase.

In a case where the heat treatment time (holding time) in the reheating step is shorter than 10 seconds, the diffusion of atoms is insufficient, and the precipitate containing Ti and having the equivalent circle diameter of 5.0 nm or less cannot be precipitated by $5.0 \times 10^{11}$ pieces/mm$^3$ or more. In a case where the heat treatment time exceeds 1,500 seconds, the precipitate becomes coarse, and the number of precipitates containing Ti and having the equivalent circle diameter of 5.0 nm or less is less than $5.0 \times 10^{11}$ pieces/mm$^3$. For this reason, it is necessary to set the heat treatment time to 10 and 1,500 seconds. The heat treatment in the temperature range of 450° C. to Ac1° C. also includes heating and slow cooling in this temperature range. That is, the heat treatment time means the time during which the steel sheet is in the temperature range of 450° C. to Ac1° C. after the reheating, and in a case where the steel sheet is held in this temperature range for a predetermined time, the temperature may change in the middle.

As shown in FIGS. 5A to 5D, by setting the heat treatment time in a range of 10 to 1,500 seconds, the number density, TS, Hvs/Hvc, and the fatigue limit of the precipitate containing Ti and having the particle diameter (equivalent circle diameter) of 5.0 nm or less after heat treatment and light reduction increase.

Figure 2:
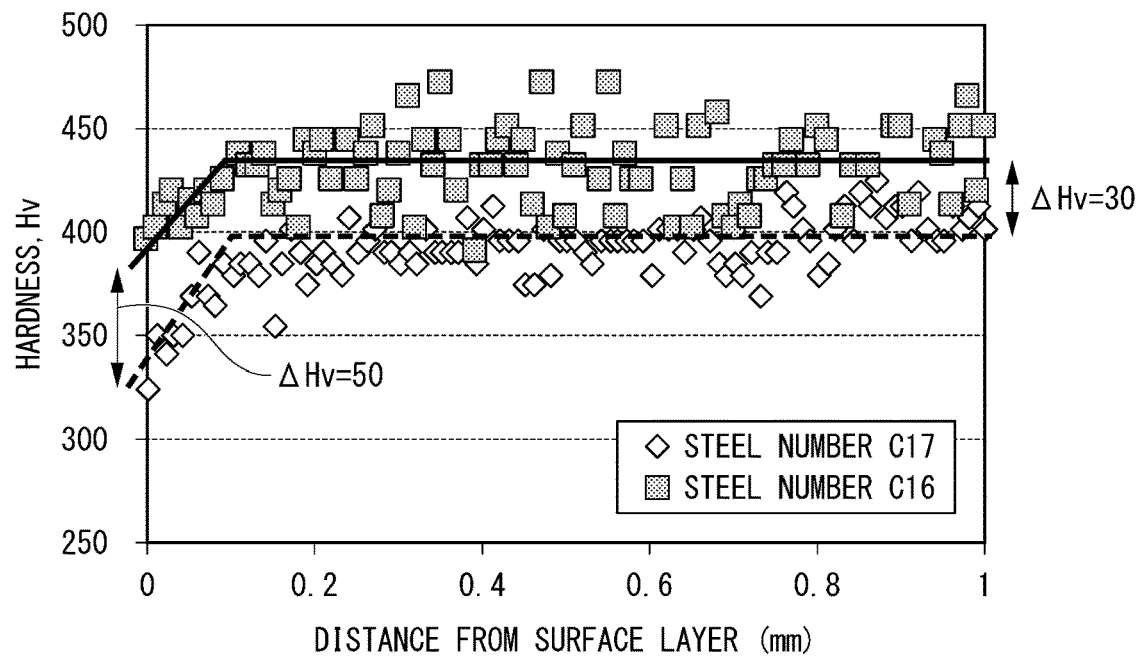
FIG. 2 is an example showing the hardness distribution of a surface layer of a steel sheet of the steel of the present invention (steel number C16 in the examples) and the comparative steel (steel number 17 in the examples).
Figure 3A:
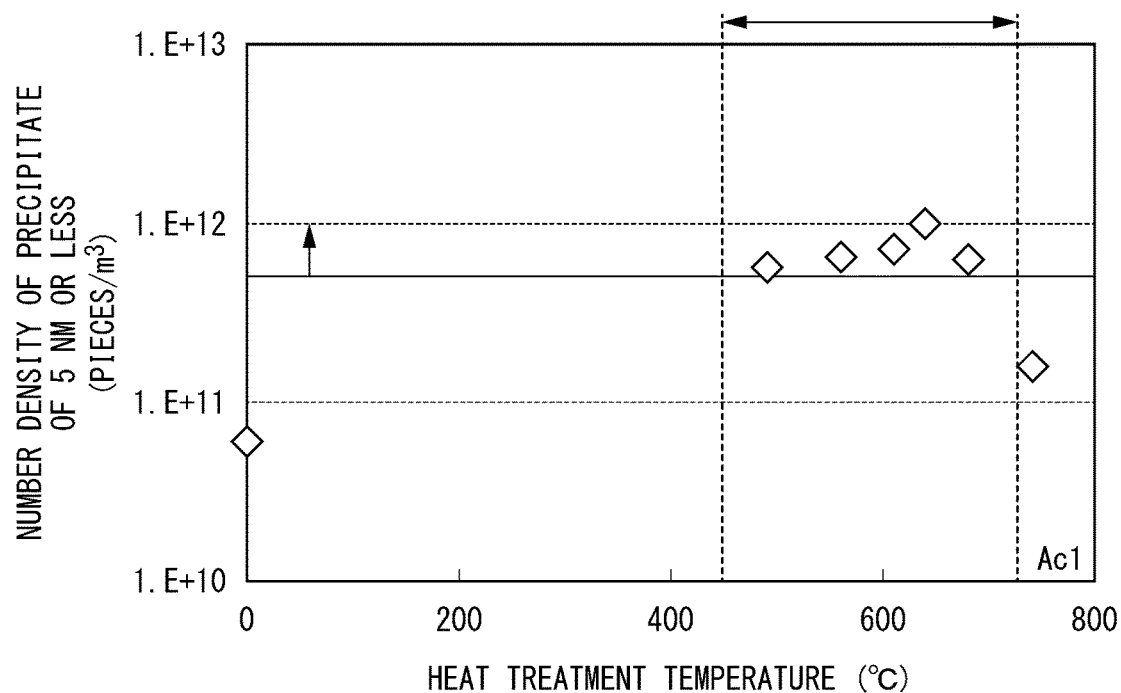
FIG. 3A is a diagram showing the relationship between the heat treatment temperature and the number density of precipitate containing Ti and having an equivalent circle diameter of 5.0 nm or less, of the steel having the chemical composition C shown in Table 1 after light reduction and heat treatment.
Figure 3B:
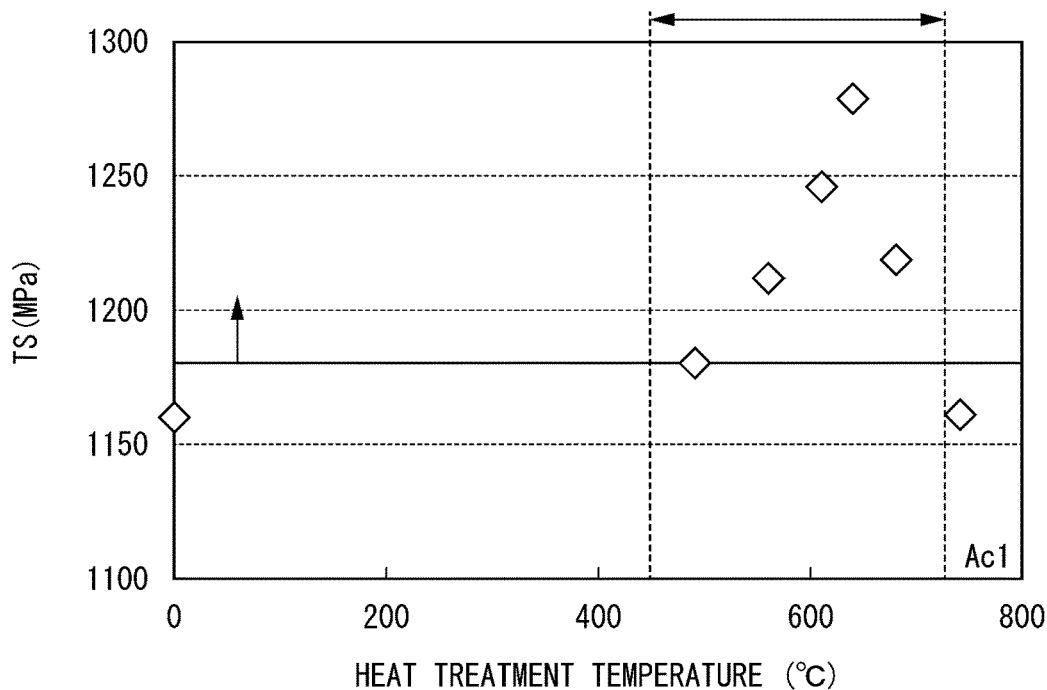
FIG. 3B is a diagram showing the relationship between the heat treatment temperature and tensile strength, of the steel having the chemical composition C shown in Table 1 after light reduction and heat treatment.
Figure 3C:
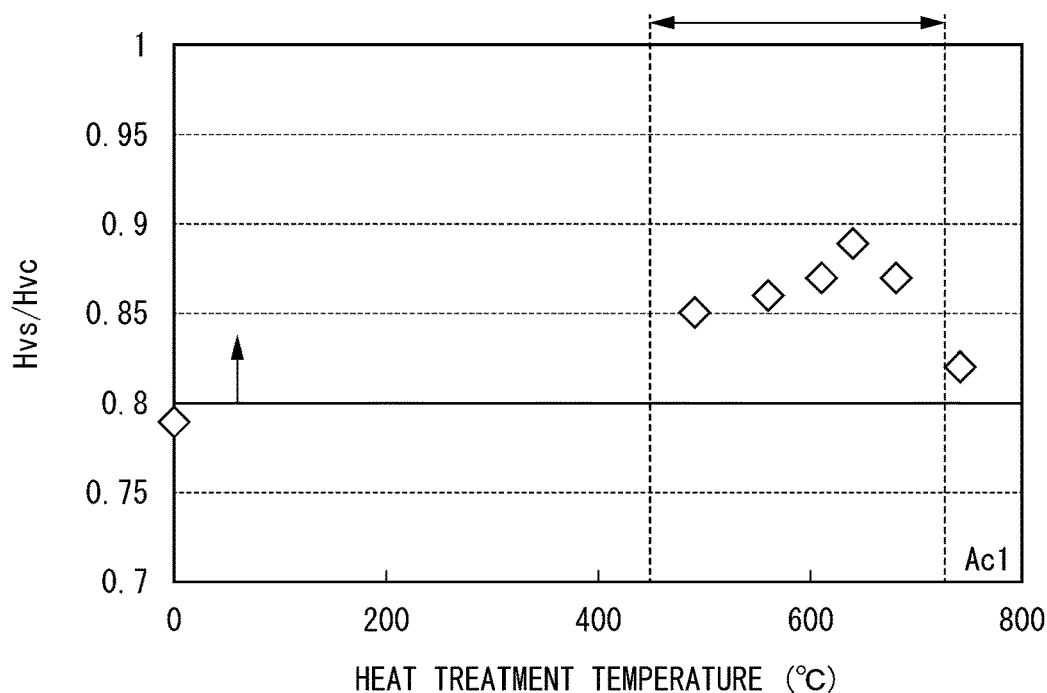
FIG. 3C is a diagram showing the relationship between the heat treatment temperature and the Hvs/Hvc (hardness ratio between surface layer to inside), of the steel having the chemical composition C shown in Table 1 after light reduction and heat treatment.
Figure 3D:
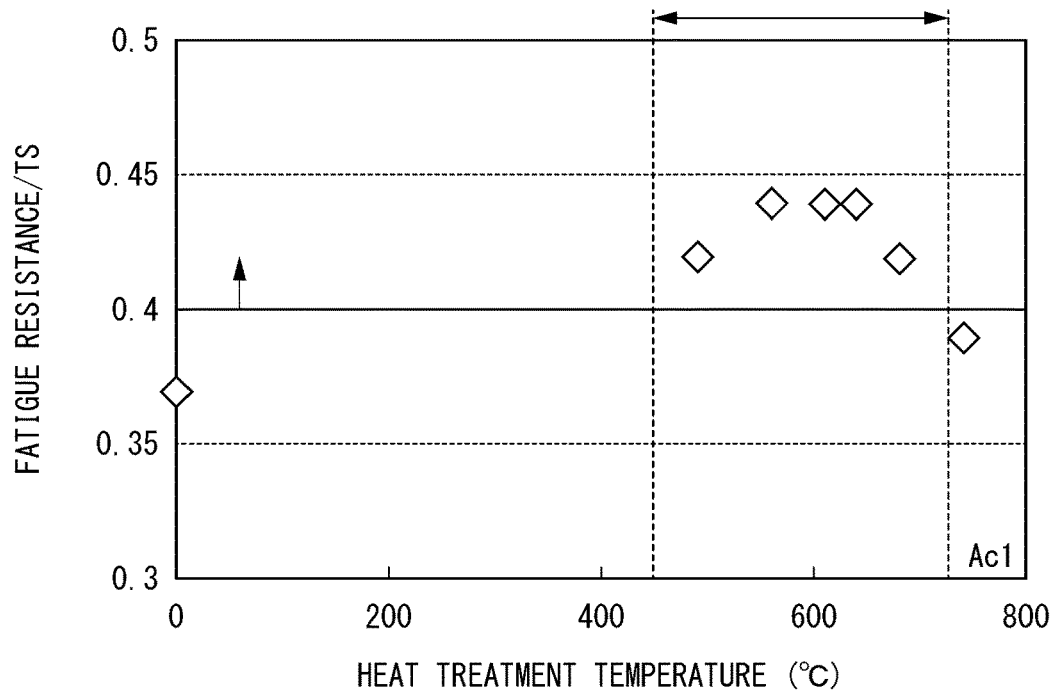
FIG. 3D is a diagram showing the relationship between the heat treatment temperature and the fatigue limit/TS (ratio of fatigue limit to TS), of the steel having the chemical composition C shown in Table 1 after light reduction and heat treatment.
Figure 4A:
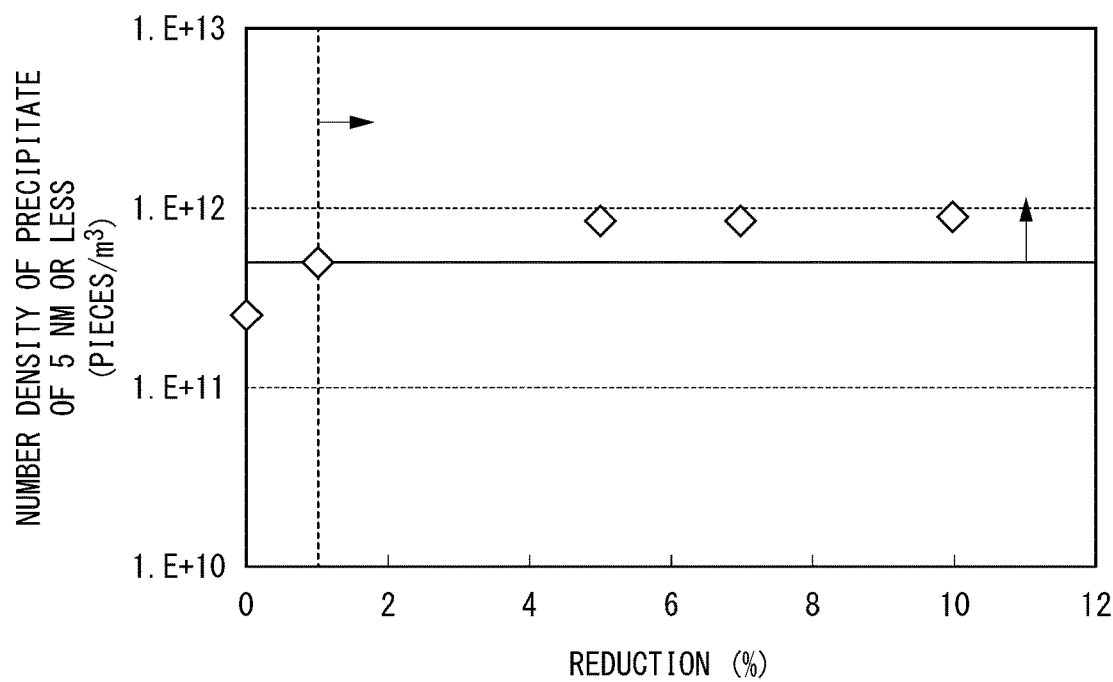
FIG. 4A is a diagram showing the relationship between rolling reduction under light reduction and the number density of precipitate containing Ti and having equivalent circle diameter of 5.0 nm or less, of the steel having the chemical composition C shown in Table 1 after performing hot rolling under the conditions of C5, C14 to C17, and the light reduction is applied.
Figure 4B:
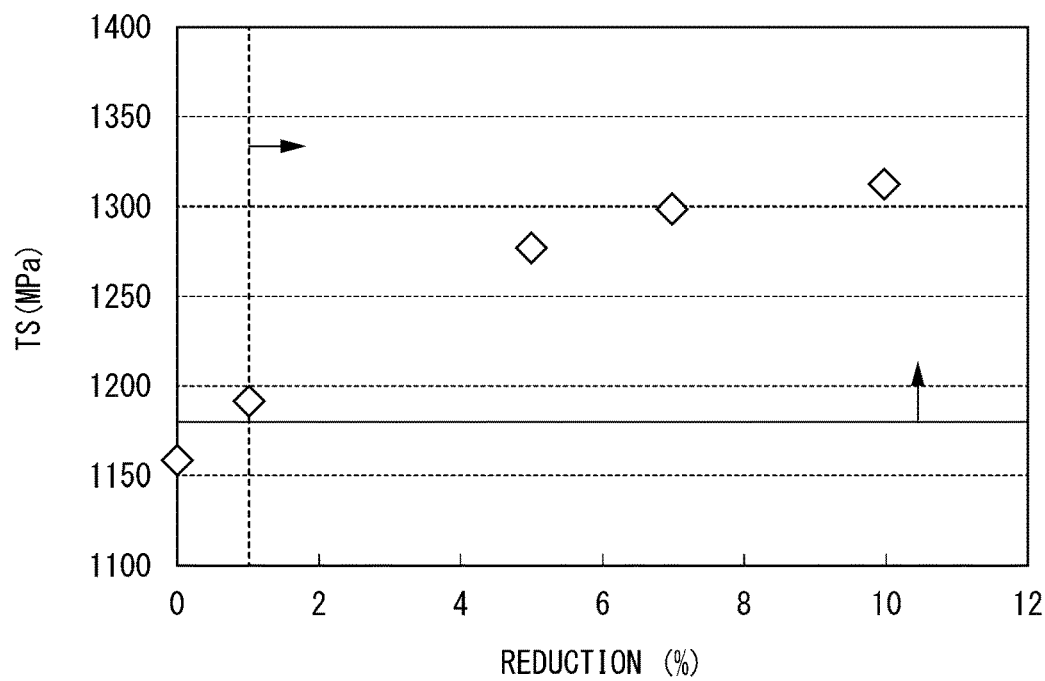
FIG. 4B is a diagram showing the relationship between rolling reduction under light reduction and tensile strength, of the steel of the chemical composition C shown in Table 1 after performing hot rolling under the conditions of C5, C14 to C17, and the light reduction is applied.
Figure 4C:
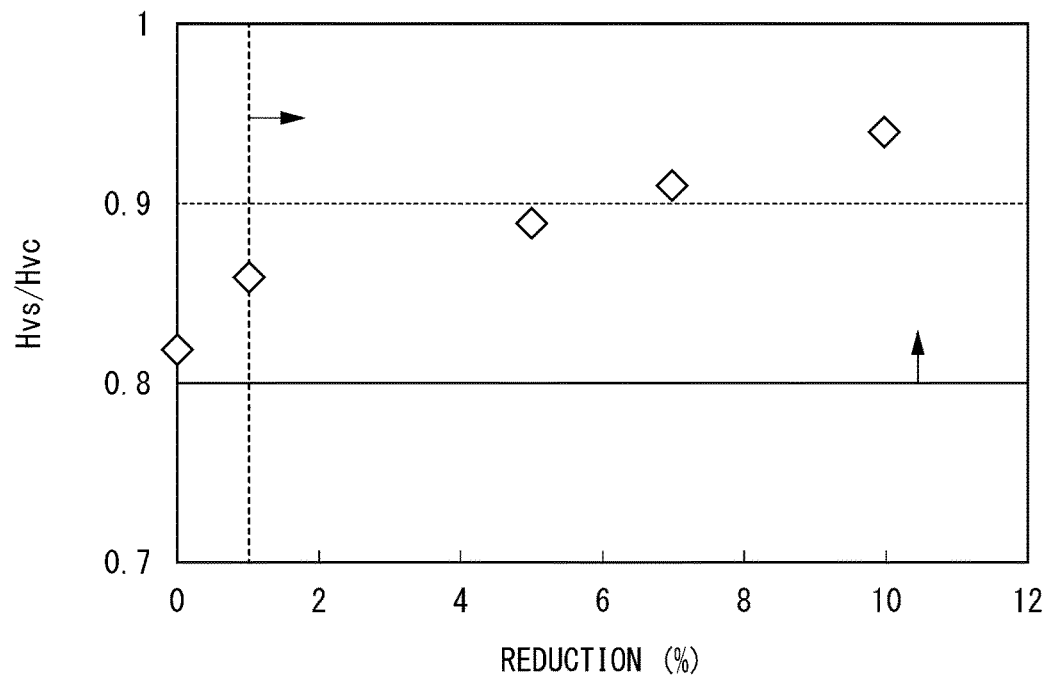
FIG. 4C is a diagram showing the relationship between rolling reduction under light reduction and Hvs/Hvc (hardness ratio of surface layer to inside), of the steel of the chemical composition C shown in Table 1 after performing hot rolling under the conditions of C5, C14 to C17, and the light reduction is applied.
Figure 4D:
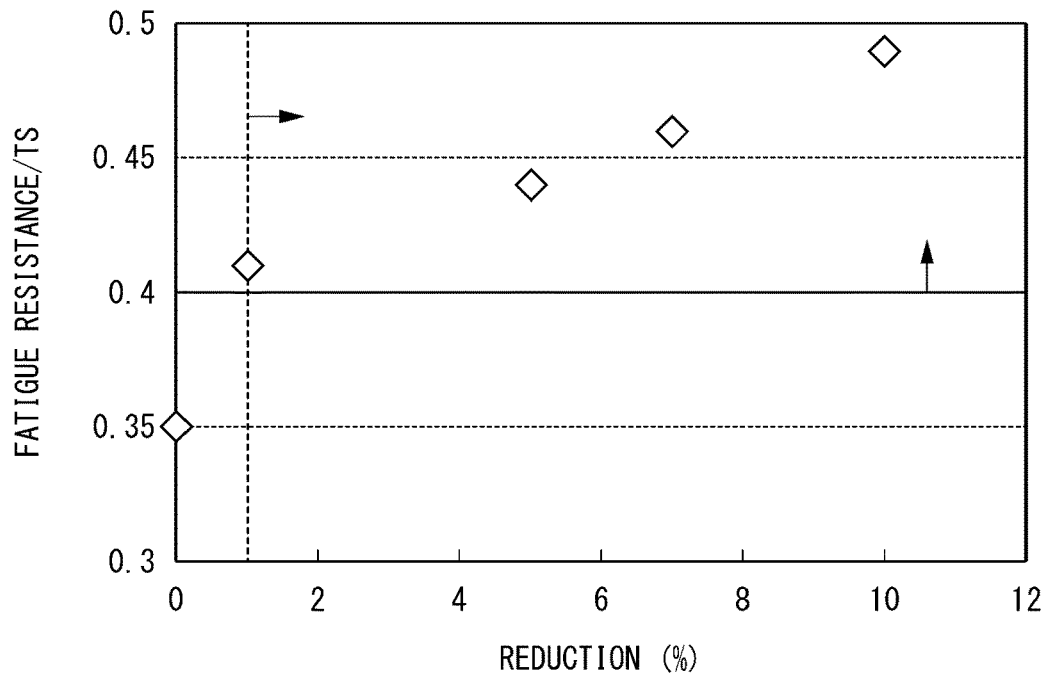
FIG. 4D is a diagram showing the relationship between rolling reduction under light reduction and the fatigue limit/TS (ratio of fatigue limit to TS), of the steel of the chemical composition C shown in Table 1 after performing hot rolling under the conditions of C5, C14 to C17, and the light reduction is applied.
Figure 5A:
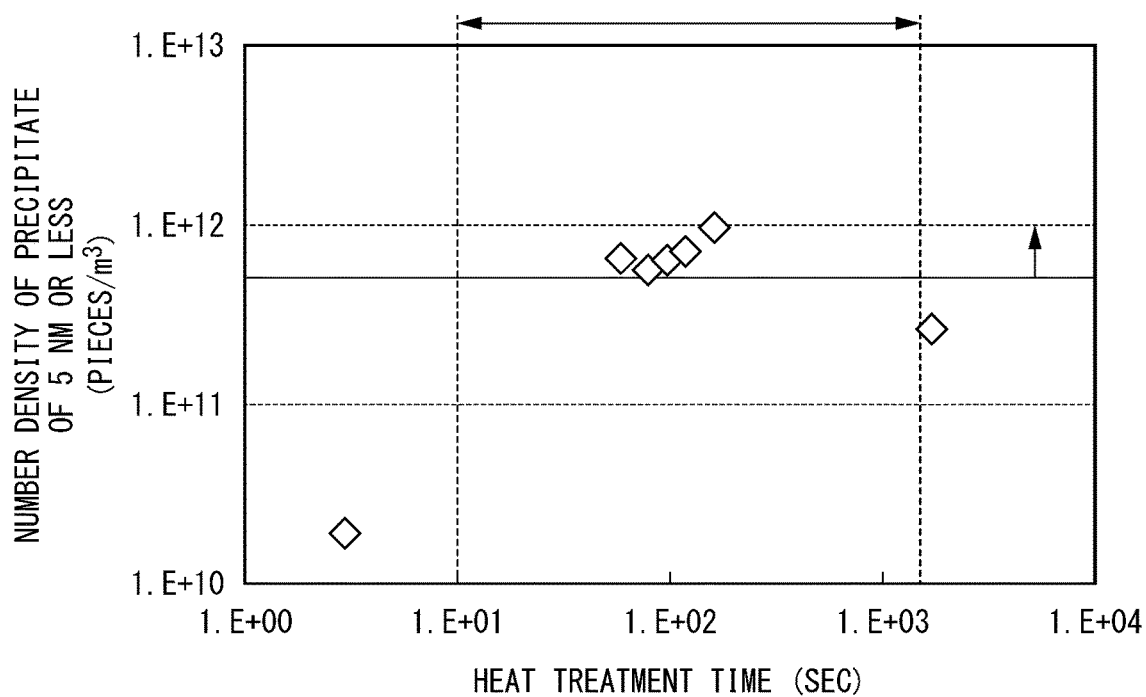
FIG. 5A is a diagram showing the relationship between the heat treatment time and the number density of precipitate containing Ti and having an equivalent circle diameter of 5.0 nm or less after heat treatment, of the steel having the chemical composition C shown in Table 1 after light reduction and heat treatment.
Figure 5B:
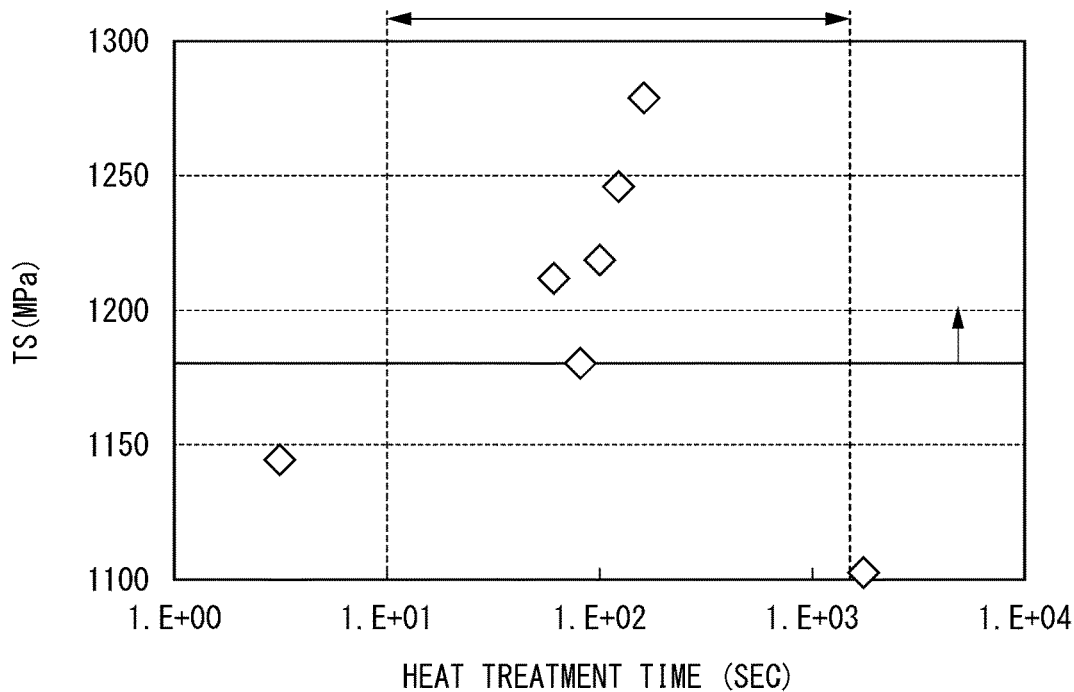
FIG. 5B is a diagram showing the relationship between the heat treatment time and the tensile strength after heat treatment, of the steel having the chemical composition C shown in Table 1 after light reduction and heat treatment.
Figure 5C:
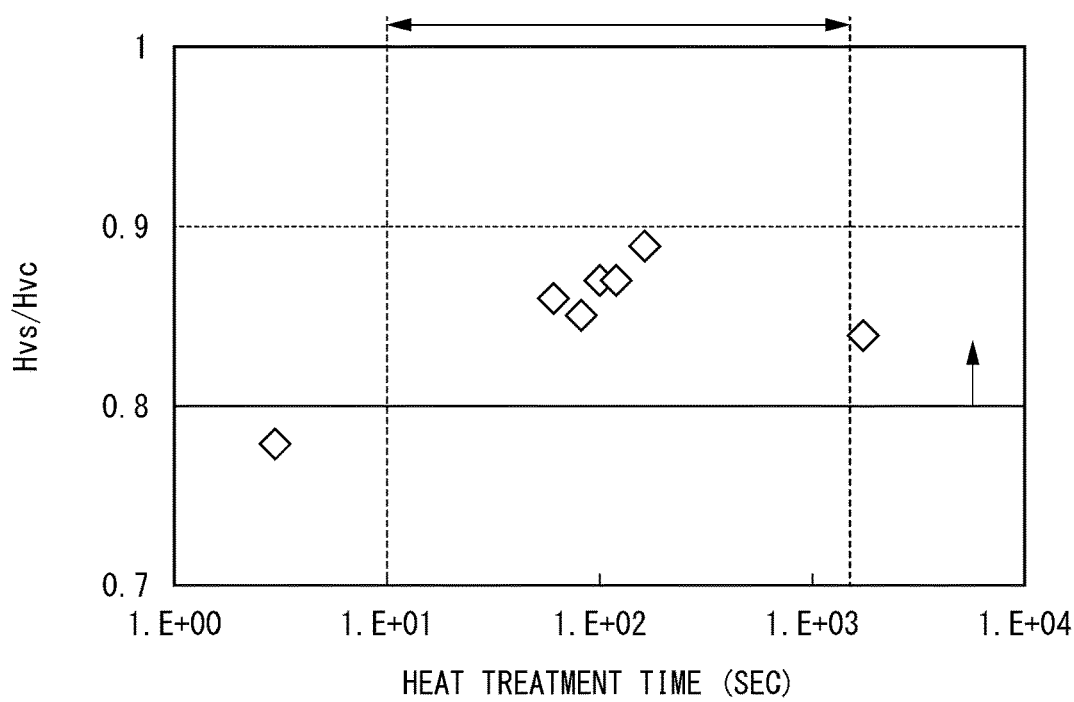
FIG. 5C is a diagram showing the relationship between the heat treatment time and the Hvs/Hvc after heat treatment (hardness ratio of surface layer to inside), of the steel having the chemical composition C shown in Table 1 after light reduction and heat treatment.
Figure 5D:
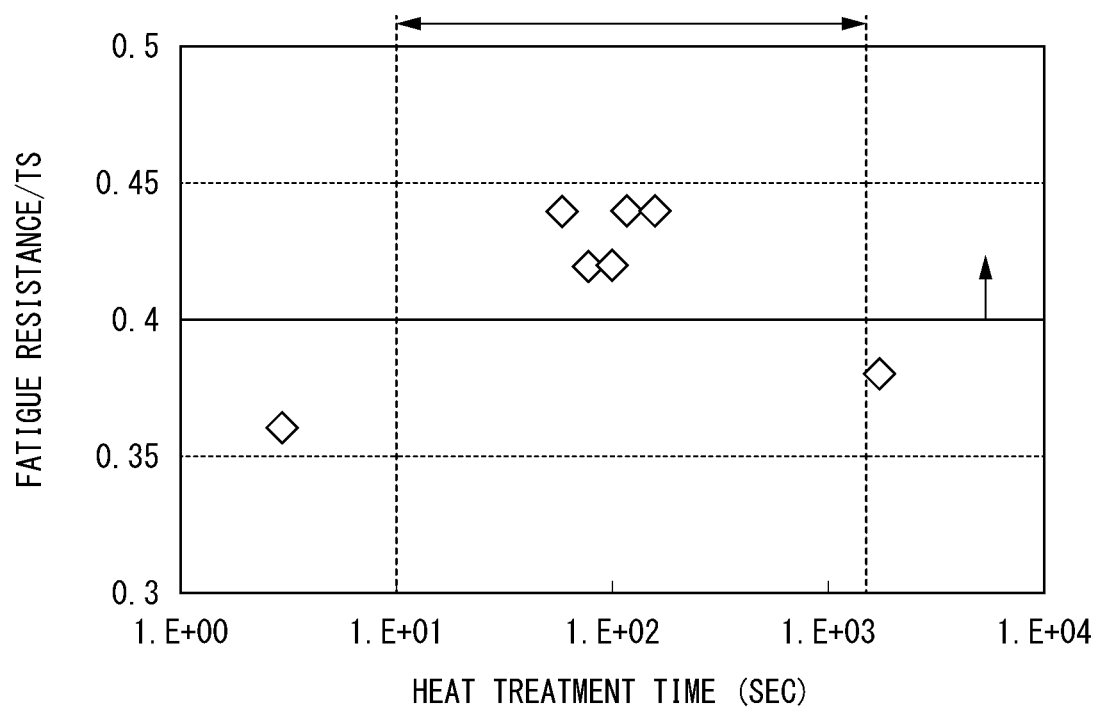
FIG. 5D is a diagram showing the relationship between the heat treatment time and the fatigue limit/TS (ratio of fatigue limit to TS) after heat treatment, of the steel having the chemical composition C shown in Table 1 after light reduction and heat treatment.

In addition, as shown in FIG. 2, the implementation of light reduction and reheating preferentially increases the surface layer hardness.

The cooling after the holding step is not particularly limited.

The steel sheet according to the present embodiment can be obtained by the manufacturing method including the above steps. However, in a case where the steel sheet according to the present embodiment is a hot-dip galvanized steel sheet or a hot-dip galvannealed steel sheet, in order to improve corrosion resistance, it is preferable that the following steps are further included.

<Plating Step>

The hot-rolled steel sheet after the reheating step is subjected to hot-dip galvanizing. Since the galvanizing contributes to the improvement of corrosion resistance, it is desirable to perform galvanizing, in a case where the steel sheet is applied for the usage where corrosion resistance is expected. The galvanizing is preferably hot-dip galvanizing.

The conditions for hot-dip galvanizing are not particularly limited, and well-known conditions may be used.

When the hot-rolled steel sheet after hot-dip galvanizing (hot-dip galvanized steel sheet) is heated to 460° C. to 600° C. to galvannealing plating, it is possible to manufacture a hot-dip galvannealed steel sheet in which a hot-dip galvanized layer is a hot-dip galvannealed layer. The hot-dip galvannealed steel sheet may be subjected to galvannealing in the galvannealing step according to the usage, since the effect of improving spot weldability or improving sliding ability during drawing can be applied, in addition to the improvement of corrosion resistance.

Even in a case where Al plating, plating containing Mg, and electroplating are performed, instead of galvanizing, it is possible to manufacture the steel sheet according to the present embodiment having the tensile strength of 1,180 MPa or more and excellent fatigue resistance.

EXAMPLES

Steels having chemical compositions shown in kinds of steel A to P and a to f in Table 1 were dissolved, and a slab having a thickness of 240 to 300 mm was manufactured by continuous casting.

The obtained slab was heated and subjected to finish rolling under conditions shown in Tables 2-1 and 2-2 to obtain a hot-rolled steel sheet having a thickness of 2.3 mm, and the hot-rolled steel sheet was subjected to water cooling to the coiling temperature, coiled as a coil, and air-cooled to room temperature.

After the coil was uncoiled, the pickling was performed, and the hot-rolled steel sheet after the pickling was lightly reduced at the rolling reductions shown in Tables 2-1 and 2-2. However, in Tables 2-1 and 2-2, the light reduction was not performed for examples in which the rolling reduction was 0%.

The hot-rolled steel sheet after the light reduction (hot-rolled steel sheet after the pickling, in a case where the light reduction is not performed) was subjected to heat treatment by reheating at a temperature shown in Tables 2-1 and 2-2, to manufacture hot-rolled steel sheets having steel numbers A1 to f1.

With respect to the hot-rolled steel sheet after the heat treatment, the plating was performed, as necessary, and in some examples, further galvannealing treatment was performed. In Tables 2-1 and 2-2, HR indicates a hot-rolled steel sheet not subjected to plating, GI indicates a hot-dip galvanized steel sheet, and GA indicates a hot-dip galvannealed steel sheet.

TABLE 1

| Kind of steel | Mass % Remainder Fe and impurities ||||||||||
|---|---|---|---|---|---|---|---|---|---|---|
| | C | Si | Mn | Ti | Nb | V | Al | P | S | N | Ni |
| A | 0.08 | 0.78 | 2.56 | 0.172 | 0.00 | 0.00 | 0.026 | 0.007 | 0.0016 | 0.0019 | |
| B | 0.07 | 0.47 | 2.19 | 0.155 | 0.00 | 0.00 | 0.029 | 0.009 | 0.0021 | 0.0024 | |
| C | 0.08 | 1.20 | 2.49 | 0.161 | 0.05 | 0.00 | 0.029 | 0.009 | 0.0021 | 0.0024 | |
| D | 0.07 | 0.65 | 1.97 | 0.142 | 0.05 | 0.00 | 0.013 | 0.007 | 0.0019 | 0.0021 | |
| E | 0.09 | 0.29 | 2.21 | 0.131 | 0.03 | 0.09 | 0.026 | 0.006 | 0.0005 | 0.0046 | |
| F | 0.08 | 0.42 | 1.84 | 0.156 | 0.03 | 0.00 | 0.045 | 0.009 | 0.0016 | 0.0027 | |
| G | 0.07 | 0.39 | 1.81 | 0.154 | 0.02 | 0.00 | 0.026 | 0.008 | 0.0021 | 0.0023 | |
| H | 0.08 | 0.45 | 1.88 | 0.161 | 0.03 | 0.00 | 0.024 | 0.007 | 0.0016 | 0.0016 | 0.19 |
| I | 0.08 | 0.65 | 1.54 | 0.149 | 0.05 | 0.13 | 0.008 | 0.005 | 0.0020 | 0.0009 | |
| J | 0.09 | 0.03 | 2.09 | 0.159 | 0.03 | 0.00 | 0.293 | 0.009 | 0.0014 | 0.0049 | |
| K | 0.07 | 0.49 | 2.29 | 0.161 | 0.02 | 0.04 | 0.029 | 0.005 | 0.0009 | 0.0028 | |
| L | 0.08 | 0.54 | 2.34 | 0.155 | 0.03 | 0.00 | 0.016 | 0.011 | 0.0015 | 0.0023 | |
| M | 0.08 | 0.57 | 2.41 | 0.152 | 0.03 | 0.00 | 0.024 | 0.008 | 0.0023 | 0.0021 | |
| N | 0.11 | 0.43 | 2.35 | 0.156 | 0.09 | 0.15 | 0.021 | 0.006 | 0.0017 | 0.0020 | |
| O | 0.07 | 0.46 | 2.43 | 0.159 | 0.04 | 0.00 | 0.028 | 0.003 | 0.0014 | 0.0019 | |
| P | 0.11 | 0.99 | 2.03 | 0.164 | 0.06 | 0.16 | 0.036 | 0.010 | 0.0030 | 0.0024 | |
| a | <u>0.01</u> | 1.56 | 2.98 | 0.162 | 0.03 | 0.00 | 0.019 | 0.006 | 0.0019 | 0.0025 | |
| b | <u>0.16</u> | 1.19 | 2.08 | 0.148 | 0.00 | 0.00 | 0.023 | 0.008 | 0.0024 | 0.0021 | |
| c | 0.09 | 0.71 | <u>0.68</u> | 0.152 | 0.03 | 0.00 | 0.013 | 0.009 | 0.0016 | 0.0019 | |
| d | 0.08 | 0.42 | <u>2.39</u> | 0.000 | 0.00 | 0.00 | 0.038 | 0.013 | 0.0011 | 0.0023 | |
| e | 0.09 | 0.45 | 2.44 | <u>0.005</u> | 0.05 | 0.04 | 0.009 | 0.011 | 0.0004 | 0.0016 | |
| f | 0.09 | 0.31 | 2.26 | <u>0.044</u> | 0.03 | 0.00 | 0.033 | 0.014 | 0.0026 | 0.0034 | |

| Kind of steel | Mass % Remainder Fe and impurities ||||||| | Ti + Nb + V (%) | Ac1 (° C.) | Note |
|---|---|---|---|---|---|---|---|---|---|---|---|
| | Cu | Cr | Mo | W | B | REM | Ca | Mg | | | |
| A | | | | | | | | | 0.172 | 718 | Steel of present invention |
| B | | | | | 0.0019 | | | | 0.155 | 713 | Steel of present invention |
| C | | | | | | | | | 0.211 | 726 | Steel of present invention |
| D | | | | | 0.0034 | | | | 0.192 | 716 | Steel of present invention |
| E | | | | | | | | | 0.251 | 710 | Steel of present invention |
| F | | | 0.23 | | | | | | 0.186 | 712 | Steel of present invention |
| G | | 0.78 | | | | | | | 0.174 | 712 | Steel of present invention |
| H | 0.11 | | | | | | | | 0.191 | 713 | Steel of present invention |

TABLE 1-continued

| | | | | | | | |
|---|---|---|---|---|---|---|---|
| I | 0.73 | | | 0.0024 | | 0.329 | 716 | Steel of present invention |
| J | | | | 0.0016 | | 0.189 | 705 | Steel of present invention |
| K | | 0.029 | | | | 0.221 | 714 | Steel of present invention |
| L | | | 0.0013 | | | 0.185 | 714 | Steel of present invention |
| M | | | | | 0.0016 | 0.182 | 715 | Steel of present invention |
| N | | | | | | 0.396 | 712 | Steel of present invention |
| O | | | | | 0.0011 | 0.199 | 713 | Steel of present invention |
| P | | | | | | 0.384 | 722 | Steel of present invention |
| a | | | | | | 0.192 | 734 | Comparative steel |
| b | | | 0.0047 | | | 0.148 | 723 | Comparative steel |
| c | | | | | | 0.182 | 717 | Comparative steel |
| d | | | 0.0027 | | | <u>0.000</u> | 712 | Comparative steel |
| e | | | 0.0019 | | | <u>0.095</u> | 712 | Comparative steel |
| f | | | | | | <u>0.074</u> | 710 | Comparative steel |

The underlined numbers are beyond the range of the present invention.

TABLE 2-1

| Steel number | Kind of steel | Slab heating temperature (° C.) | Finish rolling temperature (° C.) | Coiling temperature (° C.) | Pickling | Rolling reduction under light reduction (%) | Heat treatment temperature (° C.) | Holding time (sec) | Plating and the like | Galv-annealing temperature (° C.) | Note |
|---|---|---|---|---|---|---|---|---|---|---|---|
| A1 | A | 1290 | 970 | 25 | Performed | 5 | 660 | 40 | GA | 590 | Steel of present invention |
| B1 | B | 1290 | 950 | 160 | Performed | 3 | 650 | 60 | GA | 590 | Steel of present invention |
| C1 | C | 1300 | 960 | 25 | Performed | 2 | 650 | 120 | HR | — | Steel of present invention |
| C2 | C | 1290 | 940 | 25 | Performed | 3 | 650 | 120 | GI | — | Steel of present invention |
| C3 | C | 1310 | 970 | 25 | Performed | 5 | <u>740</u> | 100 | GA | 580 | Comparative steel |
| C4 | C | 1300 | 960 | 25 | Performed | 5 | <u>680</u> | 100 | GA | 580 | Steel of present invention |
| C5 | C | 1310 | 940 | 25 | Performed | 5 | 640 | 160 | GA | 590 | Steel of present invention |
| C6 | C | 1300 | 950 | 25 | Performed | 5 | 610 | 120 | GA | 580 | Steel of present invention |
| C7 | C | 1290 | 960 | 25 | Performed | 5 | 560 | 60 | GA | 590 | Steel of present invention |
| C8 | C | 1300 | 950 | 25 | Performed | 5 | 490 | 80 | GA | 590 | Steel of present invention |
| C9 | C | 1320 | 960 | 25 | Performed | 5 | — | 100 | GA | 590 | Comparative steel |
| C10 | C | <u>1230</u> | 970 | 25 | Performed | 1 | 630 | 100 | GA | 580 | Comparative steel |
| C11 | C | 1290 | <u>840</u> | 80 | Performed | 1 | 650 | 120 | GA | 580 | Comparative steel |
| C12 | C | 1300 | <u>960</u> | 490 | Performed | 2 | 650 | 360 | GA | 590 | Comparative steel |
| C13 | C | 1320 | 1000 | <u>670</u> | Performed | 3 | 640 | 40 | GA | 590 | Comparative steel |
| C14 | C | 1290 | 970 | <u>25</u> | Performed | 1 | 650 | 60 | GA | 590 | Steel of present invention |
| C15 | C | 1300 | 960 | 80 | Performed | 7 | 640 | 80 | GA | 590 | Steel of present invention |
| C16 | C | 1290 | 980 | 25 | Performed | 10 | 640 | 80 | GA | 590 | Steel of present invention |
| C17 | C | 1310 | 950 | 25 | Performed | <u>0</u> | 650 | 120 | GA | 580 | Comparative steel |
| C18 | C | 1290 | 980 | 120 | Performed | <u>5</u> | 430 | 100 | GA | 590 | Comparative steel |
| C19 | C | 1300 | 990 | 80 | Performed | 5 | <u>760</u> | 100 | GA | 590 | Comparative steel |
| C20 | C | 1300 | 960 | 25 | Performed | 5 | <u>620</u> | 3 | GA | 560 | Comparative steel |
| C21 | C | 1300 | 970 | 25 | Performed | 5 | 680 | <u>1700</u> | GA | 600 | Comparative steel |
| C22 | C | 1320 | 990 | 270 | Performed | 5 | <u>800</u> | 120 | GA | 590 | Comparative steel |
| C23 | C | 1300 | 1000 | 25 | Performed | <u>35</u> | <u>650</u> | 360 | GA | 600 | Comparative steel |
| C24 | C | 1290 | 980 | 25 | Performed | <u>3</u> | 660 | 60 | GA | 580 | Steel of present invention |
| C25 | C | 1310 | 960 | 25 | Performed | 3 | 650 | 60 | GA | 590 | Steel of present invention |
| D1 | D | 1300 | 960 | 80 | Performed | 3 | 650 | 120 | HR | — | Steel of present invention |
| D2 | D | 1290 | 960 | 25 | Performed | 4 | 640 | 60 | GI | — | Steel of present invention |

TABLE 2-1-continued

| Steel number | Kind of steel | Slab heating temperature (° C.) | Finish rolling temperature (° C.) | Coiling temperature (° C.) | Pickling | Rolling reduction under light reduction (%) | Heat treatment temperature (° C.) | Holding time (sec) | Plating and the like | Galv-annealing temperature (° C.) | Note |
|---|---|---|---|---|---|---|---|---|---|---|---|
| D3 | D | 1300 | 950 | 25 | Performed | 5 | 650 | 80 | GA | 550 | Steel of present invention |
| D4 | D | 1250 | 980 | 80 | Performed | 3 | 660 | 80 | GA | 540 | Comparative steel |
| D5 | D | 1300 | 870 | 130 | Performed | 3 | 630 | 100 | GA | 540 | Comparative steel |
| D6 | D | 1290 | 980 | 25 | Performed | 5 | 650 | 100 | GA | 550 | Steel of present invention |
| D7 | D | 1290 | 960 | 25 | Performed | 5 | 640 | 120 | GA | 550 | Steel of present invention |
| D8 | D | 1300 | 980 | 120 | Performed | 5 | 650 | 40 | GA | 540 | Steel of present invention |
| D9 | D | 1290 | 960 | 520 | Performed | 5 | 650 | 60 | GA | 540 | Comparative steel |
| D10 | D | 1290 | 970 | 630 | Performed | 2 | 660 | 80 | GA | 540 | Comparative steel |
| D11 | D | 1300 | 950 | 80 | Performed | 0 | 640 | 120 | GA | 550 | Comparative steel |
| D12 | D | 1300 | 980 | 25 | Performed | 5 | 420 | 80 | GA | 550 | Comparative steel |

The underlined numbers are beyond the range of the present invention.

TABLE 2-2

| Steel number | Kind of steel | Slab heating temperature (° C.) | Finish rolling temperature (° C.) | Coiling temperature (° C.) | Pickling | Rolling reduction under light reduction (%) | Heat treatment temperature (° C.) | Holding time (sec) | Plating and the like | Galv-annealing temperature (° C.) | Note |
|---|---|---|---|---|---|---|---|---|---|---|---|
| D13 | D | 1290 | 980 | 25 | Performed | 5 | 730 | 40 | GA | 550 | Comparative steel |
| D14 | D | 1310 | 980 | 25 | Performed | 5 | 620 | 6 | GA | 550 | Comparative steel |
| D15 | D | 1290 | 960 | 25 | Performed | 5 | 690 | 2100 | GA | 580 | Comparative steel |
| E1 | E | 1290 | 990 | 130 | Performed | 3 | 630 | 40 | HR | — | Steel of present invention |
| E2 | E | 1290 | 970 | 140 | Performed | 5 | 650 | 60 | GI | — | Steel of present invention |
| E3 | E | 1300 | 980 | 80 | Performed | 3 | 640 | 120 | GA | 530 | Steel of present invention |
| E4 | E | 1260 | 980 | 220 | Performed | 5 | 670 | 100 | GA | 540 | Comparative steel |
| E5 | E | 1290 | 880 | 25 | Performed | 5 | 630 | 80 | GA | 530 | Comparative steel |
| E6 | E | 1290 | 980 | 440 | Performed | 3 | 650 | 60 | GA | 530 | Comparative steel |
| E7 | E | 1290 | 970 | 590 | Performed | 5 | 650 | 60 | GA | 530 | Comparative steel |
| E8 | E | 1290 | 970 | 80 | Performed | 5 | 650 | 120 | GA | 540 | Steel of present invention |
| E9 | E | 1300 | 980 | 25 | Performed | 7 | 630 | 100 | GA | 530 | Steel of present invention |
| E10 | E | 1320 | 960 | 80 | Performed | 3 | 620 | 100 | GA | 540 | Steel of present invention |
| E11 | E | 1290 | 960 | 150 | Performed | 0 | 670 | 80 | GA | 530 | Comparative steel |
| E12 | E | 1330 | 980 | 25 | Performed | 5 | 410 | 100 | GA | 530 | Comparative steel |
| E13 | E | 1310 | 970 | 80 | Performed | 5 | 740 | 100 | GA | 530 | Comparative steel |
| E14 | E | 1290 | 980 | 25 | Performed | 5 | 640 | 8 | GA | 540 | Comparative steel |
| E15 | E | 1300 | 980 | 25 | Performed | 5 | 700 | 1600 | GA | 580 | Comparative steel |
| E16 | E | 1320 | 1020 | 25 | Performed | 5 | 780 | 120 | GA | 600 | Comparative steel |
| E17 | E | 1310 | 990 | 25 | Performed | 53 | 640 | 540 | GA | 620 | Comparative steel |
| F1 | F | 1290 | 970 | 90 | Performed | 5 | 640 | 120 | GA | 540 | Steel of present invention |
| G1 | G | 1290 | 960 | 180 | Performed | 4 | 640 | 60 | GA | 530 | Steel of present invention |
| H1 | H | 1310 | 990 | 180 | Performed | 6 | 650 | 80 | GA | 540 | Steel of present invention |
| I1 | I | 1290 | 980 | 25 | Performed | 5 | 650 | 40 | GA | 560 | Steel of present invention |
| J1 | J | 1290 | 960 | 25 | Performed | 7 | 660 | 80 | GA | 540 | Steel of present invention |
| K1 | K | 1320 | 970 | 25 | Performed | 5 | 650 | 100 | GA | 530 | Steel of present invention |
| L1 | L | 1290 | 970 | 25 | Performed | 5 | 650 | 100 | GA | 540 | Steel of present invention |
| M1 | M | 1300 | 990 | 190 | Performed | 4 | 670 | 60 | GA | 540 | Steel of present invention |
| N1 | N | 1330 | 970 | 25 | Performed | 12 | 660 | 40 | GA | 550 | Steel of present invention |
| O1 | O | 1300 | 960 | 25 | Performed | 4 | 650 | 60 | GA | 540 | Steel of present invention |
| P1 | P | 1320 | 980 | 25 | Performed | 15 | 640 | 120 | GA | 580 | Steel of present invention |
| a1 | a | 1290 | 980 | 25 | Performed | 7 | 650 | 120 | GA | 620 | Comparative steel |
| b1 | b | 1290 | 970 | 25 | Performed | 5 | 650 | 40 | GA | 590 | Comparative steel |
| c1 | c | 1290 | 960 | 25 | Performed | 4 | 670 | 60 | GA | 580 | Comparative steel |
| d1 | d | 1290 | 970 | 25 | Performed | 5 | 650 | 100 | GA | 550 | Comparative steel |
| e1 | e | 1290 | 970 | 25 | Performed | 5 | 660 | 100 | GA | 550 | Comparative steel |
| f1 | f | 1300 | 960 | 25 | Performed | 10 | 650 | 100 | GA | 560 | Comparative steel |

The underlined numbers are beyond the range of the present invention.

For the obtained hot-rolled steel sheet, microstructure observation, measurement of the number density of precipitate containing Ti and having the equivalent circle diameter of 5.0 nm or less, measurement of Hvs/Hvc, evaluation of tensile properties, evaluation of hole expansibility, and evaluation of fatigue resistance were performed.

<Microstructure Observation>

Regarding the microstructure, the obtained hot-rolled steel sheet was cut out in parallel to the rolling direction, and polished and etched with a nital reagent, and the ¼ position with a thickness from the surface in the sheet thickness direction is observed in 5 viewing fields with the SEM at the magnification of 3,000 times. Thereby, ferrite, bainite, pearlite, fresh martensite, and tempered martensite were identified, and an area ratio of the tempered martensite, and other structures is determined as the volume percentage.

<Measurement of Number Density of Precipitate Containing Ti and Having Equivalent Circle Diameter of 5.0 nm or Less>

For the number density of the precipitate containing Ti, the number density of the precipitate included per unit volume of the steel sheet for each equivalent circle diameter at 1 nm pitch was measured, by using the electrolytic extraction residual method with respect to the sample collected from the ¼ position from the surface. In this case, composition analysis of a carbide was performed with a transmission electron microscope (TEM) and an EDS, and it was confirmed that fine precipitate was the precipitate containing Ti.

<Measurement of Hvs/Hvc>

For the average hardness Hvs at the position of a depth of 20 μm from the surface, a sample was cut out from the ¼ position in the width direction of the steel sheet so that a cross section parallel to the rolling direction was a measurement surface, embedding polishing was performed, a Vickers hardness at the position of 20 μm from the surface was measured at 10 points with a load of 10 gf based on JIS Z 2244: 2009, and an average value thereof was set as Hvs. For the Hvc, a sample was cut out from the ¼ position in the width direction of the steel sheet so that a cross section parallel to the rolling direction was a measurement surface, embedding polishing was performed, a Vickers hardness at a pitch of about 0.05 mm in the sheet thickness direction from the position of 0.20 to 0.50 mm from the surface was measured at 7 points with a load of 10 gf based on JIS Z 2244:2009, and an average value thereof was set as Hvc. Hvs/Hvc was obtained from these Hvs and Hvc.

<Evaluation of Tensile Properties>

The tensile properties (YP, TS, and El) were obtained by a tensile test performed based on JIS Z 2241:2011 using JIS No. 5 test piece cut out in the direction perpendicular to the rolling direction.

It was determined that a preferable proof stress and tensile strength were obtained (high proof stress and high strength) when YP/TS was 0.90 or more and TS was 1,180 MPa or more.

<Evaluation of Hole Expansibility>

A hole expansion rate was determined by a hole expansion test method based on JIS Z 2256:2010. Specifically, the test piece was cut out from a ¼ width position in the width direction of the steel sheet, and punched using a punch having a diameter of 10 mm and a die having an inner diameter of 10.6 mm, a burr of the punched part was set to on the opposite side of the punch using a 60° Conical punch, hole expansion was performed, the test was stopped at the timing when crack generated on the punched part penetrates the sheet thickness, and a hole diameter after the hole expansion test was measured to obtain the hole expansion rate. In a case where the hole expansion rate is 20% or more, it is determined that the hole expansibility is excellent. In a case where the hole expansion rate is 20% or more, it is suitable for undercarriage compartments having a burring portion and a stretch flange portion.

<Evaluation of Fatigue Resistance>

The fatigue resistance was measured and evaluated by a plane bending fatigue test at stress ratio, R=−1 described in JIS Z 2275:1978. Specifically, after obtaining a relationship between the applied stress and the number of repetitions, the stress without fracture, even in a case where the stress is repeatedly applied $10^7$ times, was defined as a fatigue limit (FS), and the fatigue resistance was adjusted with a value obtained by dividing the fatigue limit by TS. In a case where this value exceeds 0.40, the fatigue resistance was determined to be excellent.

The results are shown in Tables 3-1 and 3-2.

TABLE 3-1

| Steel number | Microstructure volume percentage (%) | | Number density of precipitate having equivalent circle diameter of 5.0 nm or less (pieces/mm³) | Hvs/Hvc | Tensile properties | | | | Hole expansion rate (%) | Fatigue limit ratio | Note |
|---|---|---|---|---|---|---|---|---|---|---|---|
| | Tempered martensite | Other structure | | | YP (MPa) | TS (MPa) | Yield ratio | El (%) | | | |
| A1 | 100 | — | 8.9 × 10¹¹ | 0.89 | 1154 | 1189 | 0.97 | 13 | 47 | 0.44 | Steel of present invention |
| B1 | 100 | — | 9.5 × 10¹¹ | 0.87 | 1152 | 1203 | 0.96 | 13 | 43 | 0.42 | Steel of present invention |
| C1 | 100 | — | 1.0 × 10¹² | 0.86 | 1182 | 1223 | 0.97 | 12 | 47 | 0.41 | Steel of present invention |
| C2 | 100 | — | 9.3 × 10¹¹ | 0.87 | 1172 | 1216 | 0.96 | 13 | 44 | 0.42 | Steel of present invention |
| C3 | 89 | Fresh martensite | 1.6 × 10¹¹ | 0.82 | 1113 | 1162 | 0.96 | 14 | 22 | 0.39 | Comparative steel |
| C4 | 100 | — | 6.4 × 10¹¹ | 0.87 | 1186 | 1219 | 0.97 | 13 | 52 | 0.42 | Steel of present invention |
| C5 | 100 | — | 9.8 × 10¹¹ | 0.89 | 1234 | 1279 | 0.96 | 12 | 49 | 0.44 | Steel of present invention |
| C6 | 100 | — | 7.2 × 10¹¹ | 0.87 | 1201 | 1246 | 0.96 | 12 | 50 | 0.44 | Steel of present invention |
| C7 | 100 | — | 6.5 × 10¹¹ | 0.86 | 1163 | 1213 | 0.96 | 13 | 55 | 0.44 | Steel of present invention |
| C8 | 100 | — | 5.6 × 10¹¹ | 0.85 | 1129 | 1182 | 0.96 | 13 | 53 | 0.42 | Steel of present invention |
| C9 | 100 | — | 6.2 × 10¹⁰ | 0.79 | 986 | 1161 | 0.85 | 4 | 45 | 0.37 | Comparative steel |
| C10 | 100 | — | 2.5 × 10¹¹ | 0.85 | 1078 | 1116 | 0.97 | 14 | 51 | 0.4 | Comparative steel |
| C11 | 100 | — | 3.8 × 10¹¹ | 0.85 | 1106 | 1154 | 0.96 | 13 | 52 | 0.4 | Comparative steel |
| C12 | 23 | Bainite | 3.9 × 10¹¹ | 0.86 | 1026 | 1078 | 0.95 | 14 | 55 | 0.41 | Comparative steel |
| C13 | 6 | Ferrite, pearlite | 1.8 × 10¹⁰ | 0.87 | 938 | 986 | 0.95 | 15 | 58 | 0.42 | Comparative steel |
| C14 | 100 | — | 5.3 × 10¹¹ | 0.86 | 1154 | 1192 | 0.97 | 13 | 46 | 0.41 | Steel of present invention |
| C15 | 100 | — | 8.8 × 10¹¹ | 0.91 | 1251 | 1299 | 0.96 | 12 | 42 | 0.46 | Steel of present invention |
| C16 | 100 | — | 9.0 × 10¹¹ | 0.94 | 1268 | 1313 | 0.97 | 12 | 46 | 0.49 | Steel of present invention |
| C17 | 100 | — | 2.6 × 10¹¹ | 0.82 | 1118 | 1159 | 0.96 | 13 | 51 | 0.35 | Comparative steel |
| C18 | 100 | — | 9.1 × 10¹⁰ | 0.81 | 947 | 1087 | 0.87 | 13 | 56 | 0.37 | Comparative steel |
| C19 | 100 | — | 4.2 × 10¹⁰ | 0.84 | 872 | 1024 | 0.85 | 14 | 23 | 0.38 | Comparative steel |
| C20 | 100 | — | 1.9 × 10¹⁰ | 0.82 | 967 | 1145 | 0.84 | 13 | 46 | 0.36 | Comparative steel |
| C21 | 100 | — | 2.6 × 10¹¹ | 0.84 | 921 | 1103 | 0.83 | 14 | 40 | 0.38 | Comparative steel |
| C22 | 45 | Ferrite | 1.8 × 10¹¹ | 0.81 | 703 | 934 | 0.75 | 15 | 31 | 0.34 | Comparative steel |

TABLE 3-1-continued

| | Microstructure volume percentage (%) | | Number density of precipitate having equivalent circle diameter of 5.0 nm or less | | Tensile properties | | | | Hole expansion rate | Fatigue limit | |
|---|---|---|---|---|---|---|---|---|---|---|---|
| Steel number | Tempered martensite | Other structure | (pieces/mm$^3$) | Hvs/Hvc | YP (MPa) | TS (MPa) | Yield ratio | El (%) | (%) | ratio | Note |
| C23 | <u>68</u> | Ferrite (recrystallization) | 5.3 × 10$^{11}$ | <u>0.75</u> | 684 | <u>884</u> | 0.77 | 16 | 43 | 0.33 | Comparative steel |
| C24 | 88 | Bainite | 7.6 × 10$^{11}$ | 0.88 | 1106 | 1191 | 0.93 | 12 | 51 | 0.41 | Steel of present invention |
| C25 | 96 | Ferrite | 6.9 × 10$^{11}$ | 0.86 | 1076 | 1182 | 0.91 | 12 | 46 | 0.41 | Steel of present invention |
| D1 | 100 | — | 9.5 × 10$^{11}$ | 0.87 | 1186 | 1234 | 0.96 | 13 | 44 | 0.42 | Steel of present invention |
| D2 | 100 | — | 1.3 × 10$^{12}$ | 0.88 | 1185 | 1218 | 0.97 | 13 | 46 | 0.43 | Steel of present invention |
| D3 | 100 | — | 9.1 × 10$^{12}$ | 0.89 | 1209 | 1242 | 0.97 | 11 | 43 | 0.44 | Steel of present invention |
| D4 | 100 | — | <u>1.6 × 10$^{10}$</u> | 0.87 | 1062 | <u>1099</u> | 0.97 | 14 | 51 | 0.42 | Comparative steel |
| D5 | 100 | — | <u>3.9 × 10$^{11}$</u> | 0.87 | 1102 | <u>1146</u> | 0.96 | 12 | 47 | 0.42 | Comparative steel |
| D6 | 100 | — | <u>9.0 × 10$^{11}$</u> | 0.89 | 1182 | <u>1234</u> | 0.96 | 13 | 42 | 0.44 | Steel of present invention |
| D7 | 100 | — | 9.5 × 10$^{11}$ | 0.89 | 1181 | 1229 | 0.96 | 12 | 46 | 0.44 | Steel of present invention |
| D8 | 100 | — | 1.0 × 10$^{12}$ | 0.89 | 1201 | 1240 | 0.97 | 12 | 47 | 0.44 | Steel of present invention |
| D9 | <u>23</u> | Bainite, pearlite | 2.8 × 10$^{11}$ | 0.89 | 985 | 1042 | 0.95 | 14 | 56 | 0.44 | Comparative steel |
| D10 | <u>9</u> | Ferrite, bainite, pearlite | <u>4.8 × 10$^{8}$</u> | 0.86 | 921 | <u>962</u> | 0.96 | 15 | 53 | 0.41 | Comparative steel |
| D11 | 100 | — | 4.1 × 10$^{11}$ | <u>0.81</u> | 1095 | <u>1143</u> | 0.96 | 14 | 52 | 0.36 | Comparative steel |

The underlined numbers are beyond the range of the present invention.

TABLE 3-2

| | Microstructure volume percentage (%) | | Number density of precipitate having equivalent circle diameter of 5.0 nm or less | | Tensile properties | | | | Hole expansion rate | Fatigue limit | |
|---|---|---|---|---|---|---|---|---|---|---|---|
| Steel number | Tempered martensite | Other structure | (pieces/mm$^3$) | Hvs/Hvc | YP (MPa) | TS (MPa) | Yield ratio | El (%) | (%) | ratio | Note |
| D12 | 100 | — | <u>7.9 × 10$^{10}$</u> | <u>0.83</u> | 919 | <u>1062</u> | 0.87 | 15 | 58 | 0.38 | Comparative steel |
| D13 | 100 | — | <u>3.9 × 10$^{10}$</u> | <u>0.84</u> | 861 | <u>1011</u> | 0.85 | 15 | 27 | 0.37 | Comparative steel |
| D14 | 100 | — | <u>2.1 × 10$^{11}$</u> | <u>0.81</u> | 936 | <u>1123</u> | 0.83 | 14 | 48 | 0.35 | Comparative steel |
| D15 | 100 | — | <u>2.9 × 10$^{11}$</u> | <u>0.84</u> | 925 | <u>1098</u> | 0.84 | 15 | 39 | 0.38 | Comparative steel |
| E1 | 100 | — | 7.9 × 10$^{11}$ | 0.87 | 1172 | 1214 | 0.97 | 14 | 42 | 0.42 | Steel of present invention |
| E2 | 100 | — | 9.5 × 10$^{11}$ | 0.89 | 1149 | 1196 | 0.96 | 14 | 45 | 0.44 | Steel of present invention |
| E3 | 100 | — | 9.0 × 10$^{11}$ | 0.87 | 1162 | 1208 | 0.96 | 13 | 43 | 0.42 | Steel of present invention |
| E4 | 100 | — | <u>9.4 × 10$^{10}$</u> | 0.89 | 1119 | 1164 | 0.96 | 12 | 45 | 0.44 | Comparative steel |
| E5 | 100 | — | <u>2.5 × 10$^{11}$</u> | 0.89 | 1104 | <u>1124</u> | 0.98 | 13 | 49 | 0.44 | Comparative steel |
| E6 | <u>39</u> | Bainite | <u>3.1 × 10$^{11}$</u> | 0.87 | 926 | <u>1026</u> | 0.90 | 14 | 51 | 0.42 | Comparative steel |
| E7 | <u>4</u> | Ferrite, pearlite | <u>6.4 × 10$^{9}$</u> | 0.89 | 872 | <u>912</u> | 0.96 | 15 | 54 | 0.44 | Comparative steel |
| E8 | 100 | — | 1.4 × 10$^{12}$ | 0.89 | 1211 | 1261 | 0.96 | 11 | 44 | 0.44 | Steel of present invention |
| E9 | 100 | — | 8.6 × 10$^{11}$ | 0.91 | 1172 | 1221 | 0.96 | 12 | 43 | 0.46 | Steel of present invention |
| E10 | 100 | — | 7.2 × 10$^{11}$ | 0.87 | 1156 | 1208 | 0.96 | 13 | 47 | 0.42 | Steel of present invention |
| E11 | 100 | — | 4.2 × 10$^{11}$ | <u>0.82</u> | 1117 | <u>1137</u> | 0.98 | 14 | 48 | 0.36 | Comparative steel |
| E12 | 100 | — | <u>5.2 × 10$^{9}$</u> | <u>0.82</u> | 951 | <u>1108</u> | 0.86 | 14 | 52 | 0.35 | Comparative steel |
| E13 | 100 | — | <u>2.6 × 10$^{10}$</u> | <u>0.84</u> | 864 | <u>998</u> | 0.87 | 16 | 26 | 0.38 | Comparative steel |
| E14 | 100 | — | <u>3.6 × 10$^{11}$</u> | <u>0.83</u> | 986 | <u>1157</u> | 0.85 | 13 | 46 | 0.36 | Comparative steel |
| E15 | 100 | — | <u>1.8 × 10$^{11}$</u> | <u>0.84</u> | 876 | <u>1046</u> | 0.84 | 15 | 39 | 0.37 | Comparative steel |
| E16 | <u>46</u> | Ferrite | 2.4 × 10$^{11}$ | <u>0.80</u> | 684 | <u>927</u> | 0.74 | 15 | 35 | 0.32 | Comparative steel |
| E17 | <u>23</u> | Ferrite (recrystallization) | 5.9 × 10$^{11}$ | <u>0.77</u> | 638 | <u>842</u> | 0.76 | 15 | 46 | 0.34 | Comparative steel |
| F1 | 100 | — | 9.1 × 10$^{11}$ | 0.89 | 1182 | 1216 | 0.97 | 13 | 46 | 0.44 | Steel of present invention |
| G1 | 100 | — | 8.0 × 10$^{11}$ | 0.88 | 1160 | 1192 | 0.97 | 13 | 47 | 0.43 | Steel of present invention |
| H1 | 100 | — | 7.7 × 10$^{11}$ | 0.9 | 1148 | 1182 | 0.97 | 13 | 46 | 0.45 | Steel of present invention |
| I1 | 100 | — | 9.4 × 10$^{11}$ | 0.89 | 1172 | 1199 | 0.98 | 13 | 50 | 0.44 | Steel of present invention |
| J1 | 100 | — | 8.8 × 10$^{11}$ | 0.91 | 1169 | 1204 | 0.97 | 12 | 43 | 0.46 | Steel of present invention |
| K1 | 100 | — | 8.1 × 10$^{11}$ | 0.89 | 1184 | 1208 | 0.98 | 13 | 46 | 0.44 | Steel of present invention |
| L1 | 100 | — | 7.2 × 10$^{11}$ | 0.89 | 1142 | 1194 | 0.96 | 14 | 45 | 0.44 | Steel of present invention |
| M1 | 100 | — | 7.8 × 10$^{11}$ | 0.88 | 1149 | 1198 | 0.96 | 13 | 42 | 0.43 | Steel of present invention |
| N1 | 100 | — | 2.3 × 10$^{12}$ | 0.87 | 1402 | 1475 | 0.95 | 11 | 32 | 0.47 | Steel of present invention |
| O1 | 100 | — | 9.1 × 10$^{11}$ | 0.88 | 1186 | 1230 | 0.96 | 11 | 46 | 0.43 | Steel of present invention |
| P1 | 100 | — | 3.4 × 10$^{12}$ | 0.91 | 1419 | 1489 | 0.95 | 12 | 35 | 0.47 | Steel of present invention |
| a1 | <u>16</u> | Bainite | 1.4 × 10$^{11}$ | 0.86 | 712 | <u>845</u> | 0.84 | 17 | 57 | 0.46 | Comparative steel |
| b1 | 100 | — | 3.3 × 10$^{11}$ | <u>0.84</u> | 984 | <u>1112</u> | 0.88 | 12 | 48 | 0.37 | Comparative steel |
| c1 | <u>0</u> | Ferrite, pearlite | <u>1.6 × 10$^{10}$</u> | <u>0.82</u> | 795 | <u>892</u> | 0.89 | 15 | 56 | 0.38 | Comparative steel |
| d1 | 100 | — | <u>0</u> | <u>0.84</u> | 566 | <u>716</u> | 0.79 | 18 | 89 | 0.36 | Comparative steel |

TABLE 3-2-continued

| Steel number | Microstructure volume percentage (%) | | Number density of precipitate having equivalent circle diameter of 5.0 nm or less (pieces/mm³) | Hvs/Hvc | Tensile properties | | | | Hole expansion rate (%) | Fatigue limit ratio | Note |
|---|---|---|---|---|---|---|---|---|---|---|---|
| | Tempered martensite | Other structure | | | YP (MPa) | TS (MPa) | Yield ratio | El (%) | | | |
| e1 | 100 | — | 1.2 × 10⁸ | 0.84 | 723 | 849 | 0.85 | 16 | 76 | 0.35 | Comparative steel |
| f1 | 100 | — | <u>2.6 × 10⁹</u> | <u>0.82</u> | 631 | <u>761</u> | 0.83 | 20 | 73 | 0.32 | Comparative steel |

The underlined numbers are beyond the range of the present invention.

As can be seen from Tables 1 to 3-2, in the example (steel of the present invention) having the chemical composition of the present invention and satisfying the hot rolling conditions, the rolling reduction, and the heat treatment conditions of the present invention, the number density of the precipitate containing Ti and having the equivalent circle diameter of 5.0 nm or less was $5.0 \times 10^{11}$ pieces/mm³ or more. In addition, in these examples, a tensile strength of 1,180 MPa or more, a high yield ratio (YP/TS) of 0.90 or more, and excellent fatigue resistance were achieved.

On the other hand, in the steel numbers C3, C19, D13, and E13 in which the heat treatment temperature in the reheating step exceeds Ac1° C., the precipitate became coarse, the number density of the precipitate containing Ti and having an equivalent circle diameter of 5.0 nm or less could not be ensured as $5.0 \times 10^{11}$ pieces/mm³ or more, and tensile strength of 1,180 MPa or more could not be ensured. In addition, in the C3 in which the heat treatment temperature was high, since the austenite formed during heating was transformed into martensite, a structure containing a large amount of fresh martensite was obtained, and a value with a low hole expansion rate was shown.

In the C22 and E16 in which the heat treatment temperature was high, since the austenite formed during heating was transformed into ferrite, the precipitate containing Ti was coarsened and the consistency between the precipitate and ferrite was lost due to the transformation. Therefore, it was not possible to ensure a tensile strength of 1,180 MPa or more.

In the steel numbers C9, C18, D12, and E12 in which the heat treatment temperature was lower than 450° C., the formation of precipitate containing Ti was insufficient. As a result, the number density was less than $5.0 \times 10^{11}$ pieces/mm³, and it was not possible to ensure a tensile strength of 1,180 MPa or more.

In the steel numbers C10, D4, and E4 in which the slab heating temperature was 1,280° C. or lower, the coarse precipitate formed during casting could not be dissolved at hot rolling, and even in a case where the subsequent reduction and heat treatment were performed, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel numbers C11, D5, and E5 in which the hot-rolled finish rolling temperature was lower than 930° C., coarse precipitate was formed until the finish rolling, and even in a case where the subsequent reduction and heat treatment were performed, the number density of the precipitate containing Ti and having an equivalent circle diameter of 5.0 nm or less could not be ensured as $5.0 \times 10^{11}$ pieces/mm³ or more, and a tensile strength of 1,180 MPa or more could not be ensured.

In the steel numbers C12, C13, D9, D10, E6, and E7 in which the coiling temperature after hot rolling was 300° C. or higher, ferrite, bainite, and pearlite were generated in an amount of 20 volume % or more after hot rolling and coiling, and martensite volume percentage could not be 80% or more. Therefore, even in a case where the subsequent reduction and heat treatment are performed, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel numbers C17, D11, and E11 in which the light reduction is less than 1%, the dislocation as a nucleation site of precipitate is not introduced, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel numbers C23 and E17 in which the light reduction is more than 30%, recrystallization was occurred during the heat treatment. As a result, the consistency between the ferrite as the primary phase and the precipitate containing Ti was lost. Accordingly, the amount of hardening due to the precipitate was decreased, and it was not possible to ensure a tensile strength of 1,180 MPa or more.

In the steel numbers C20, D14, and E14 in which a heat treatment time was shorter than 10 seconds, the heat treatment time was too short. Accordingly, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel numbers C21, D15, and E15 in which a heat treatment time was longer than 1,500 seconds, the precipitate was coarsened during the heat treatment. Accordingly, the number density of precipitate containing Ti and having an equivalent circle diameter of 5.0 nm or less could not be ensured as $5.0 \times 10^{11}$ pieces/mm³ or more, and it was not possible to ensure tensile strength of 1,180 MPa or more.

In the steel number a1, since the C content was too low, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel number b1, since the C content was too high, the coarse precipitate of Ti could not be sufficiently dissolved under the present slab heating conditions, and even in a case where reduction and heat treatment were performed in the subsequent step, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel number c1, since the Mn content was too low, ferrite and pearlite were formed between the finishing of hot rolling to coiling, and the tempered martensite could not be 80% or more. As a result, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel numbers d1 and e1, since the amounts of Ti, Nb, and V were too low, the number density of precipitate containing Ti and having an equivalent circle diameter of 5.0 nm or less could not be ensured as $5.0 \times 10^{11}$ pieces/mm³ or more, and it was not possible to ensure a tensile strength of 1,180 MPa or more.

In the steel number f1, since the amounts of Ti, Nb, and V were too low, the number density of precipitate containing Ti and having an equivalent circle diameter of 5.0 nm or less could not be ensured as $5.0 \times 10^{11}$ pieces/mm³ or more and it was not possible to ensure a tensile strength of 1,180 MPa or more.

INDUSTRIAL APPLICABILITY

According to the present invention, it is possible to provide a high-strength steel sheet having a tensile strength of 1,180 MPa or more, which has high proof stress, and excellent fatigue resistance. This steel sheet has great industrial value, because it contributes to weight reduction of vehicle components. In addition, this steel sheet is suitable for undercarriage compartments of vehicles, since it has high strength (high tensile strength), high proof stress, and excellent fatigue resistance.

What is claimed is:

1. A high-strength steel sheet, comprising,
as a chemical composition, by mass %:
C: 0.020 to 0.120%;
Si: 0.01 to 2.00%;
Mn: 1.00 to 3.00%;
Ti: 0.010 to 0.200%;
Nb: 0 to 0.100%;
V: 0 to 0.200%;
Al: 0.005 to 1.000%;
P: 0.100% or less;
S: 0.0100% or less;
N: 0.0100% or less;
Ni: 0 to 2.00%;
Cu: 0 to 2.00%;
Cr: 0 to 2.00%;
Mo: 0 to 2.00%;
W: 0 to 0.100%;
B: 0 to 0.0100%;
REM: 0 to 0.0300%;
Ca: 0 to 0.0300%;
Mg: 0 to 0.0300%; and
a remainder of Fe and impurities,
wherein $0.100 \leq Ti+Nb+V \leq 0.450$ is satisfied,
a microstructure contains, by volume percentage, 80% or more of tempered martensite, and a remainder consists of ferrite and bainite,
the microstructure contains $5.0 \times 10^{11}$ pieces/mm³ or more of, per unit volume, precipitate containing Ti and having an equivalent circle diameter of 5.0 nm or less,
Hvs/Hvc which is a ratio of an average hardness Hvs at a position of a depth of 20 μm from a surface to an average hardness Hvc at a position of 0.20 to 0.50 mm from the surface is 0.85 or more,
a tensile strength is 1,180 MPa or more, and
a yield ratio is 0.95 or more.

2. The high-strength steel sheet according to claim 1, comprising:
as the chemical composition, by mass %, at least one of:
Ni: 0.01 to 2.00%;
Cu: 0.01 to 2.00%;
Cr: 0.01 to 2.00%;
Mo: 0.01 to 2.00%;
W: 0.005 to 0.100%;
B: 0.0005 to 0.0100%;
REM: 0.0003 to 0.0300%;
Ca: 0.0003 to 0.0300%; and
Mg: 0.0003 to 0.0300%.

3. The high-strength steel sheet according to claim 1 further comprising a hot-dip galvanized layer on the surface.

4. The high-strength steel sheet according to claim 3, wherein the hot-dip galvanized layer is a hot-dip galvannealed layer.

5. A method for manufacturing the high-strength steel sheet according to claim 1, the method comprising:
a heating step of heating a slab including, as a chemical composition, by mass %: C: 0.020 to 0.120%, Si: 0.01 to 2.00%, Mn: 1.00 to 3.00%, Ti: 0.010 to 0.200%, Nb: 0 to 0.100%, V: 0 to 0.200%, Al: 0.005 to 1.000%, P: 0.100% or less, S: 0.0100% or less, N: 0.0100% or less, Ni: 0 to 2.00%, Cu: 0 to 2.00%, Cr: 0 to 2.00%, Mo: 0 to 2.00%, W: 0 to 0.100%, B: 0 to 0.0100%, REM: 0 to 0.0300%, Ca: 0 to 0.0300%, Mg: 0 to 0.0300%, and a remainder of Fe and impurities, to higher than 1,280° C.;
a hot rolling step of performing hot rolling with respect to the slab such that a finish rolling temperature is 930° C. or higher to obtain a hot-rolled steel sheet;
a coiling step of coiling the hot-rolled steel sheet at a temperature lower than 300° C. and cooling the hot-rolled steel sheet to room temperature;
a pickling step of pickling the hot-rolled steel sheet after the coiling step;
a light reduction step of performing light reduction with respect to the hot-rolled steel sheet after the pickling step at rolling reduction of 1% to 30%; and
a reheating step of reheating the hot-rolled steel sheet after the light reduction step in a temperature range of 450° C. to Ac1° C. and holding for 10 to 1,500 seconds.

6. The method according to claim 5, further comprising a plating step of hot-dip galvanizing the hot-rolled steel sheet after the reheating step.

7. The method according to claim 6 further comprising performing a galvannealing step of galvannealing by heating the hot-rolled steel sheet after the hot-dip galvanizing step to 460° C. to 600° C.

8. A high-strength steel sheet, comprising,
as a chemical composition, by mass %:
C: 0.020 to 0.120%;
Si: 0.01 to 2.00%;
Mn: 1.00 to 3.00%;
Ti: 0.010 to 0.200%;
Nb: 0 to 0.100%;
V: 0 to 0.200%;
Al: 0.005 to 1.000%;
P: 0.100% or less;
S: 0.0100% or less;
N: 0.0100% or less;
Ni: 0 to 2.00%;
Cu: 0 to 2.00%;
Cr: 0 to 2.00%;
Mo: 0 to 2.00%;

W: 0 to 0.100%;
B: 0 to 0.0100%;
REM: 0 to 0.0300%;
Ca: 0 to 0.0300%;
Mg: 0 to 0.0300%; and
a remainder of Fe and impurities,
wherein $0.100 \leq Ti+Nb+V \leq 0.450$ is satisfied,
a microstructure contains, by volume percentage, 80% or more of tempered martensite, and a remainder comprises ferrite and bainite,
the microstructure contains $5.0 \times 10^{11}$ pieces/mm$^3$ or more of, per unit volume, precipitate containing Ti and having an equivalent circle diameter of 5.0 nm or less,
Hvs/Hvc which is a ratio of an average hardness Hvs at a position of a depth of 20 μm from a surface to an average hardness Hvc at a position of 0.20 to 0.50 mm from the surface is 0.85 or more,
a tensile strength is 1,180 MPa or more, and
a yield ratio is 0.95 or more.

* * * * *